(12) United States Patent
Phillips

(10) Patent No.: US 12,546,208 B2
(45) Date of Patent: Feb. 10, 2026

(54) APPARATUS FOR AFFIXING A ROTATION SENSOR TO A ROD LIFT SYSTEM

(71) Applicant: Walter Phillips, Huntington Beach, CA (US)

(72) Inventor: Walter Phillips, Huntington Beach, CA (US)

(73) Assignee: Walter Phillips, Huntington Beach, CA (US)

( * ) Notice: Subject to any disclaimer, the term of this patent is extended or adjusted under 35 U.S.C. 154(b) by 8 days.

(21) Appl. No.: 18/513,548

(22) Filed: Nov. 18, 2023

(65) Prior Publication Data

US 2024/0167375 A1    May 23, 2024

Related U.S. Application Data

(60) Provisional application No. 63/579,003, filed on Aug. 26, 2023, provisional application No. 63/479,728, filed on Jan. 12, 2023, provisional application No. 63/384,308, filed on Nov. 18, 2022.

(51) Int. Cl.
*E21B 47/009* (2012.01)
*E21B 43/12* (2006.01)

(52) U.S. Cl.
CPC .......... *E21B 47/009* (2020.05); *E21B 43/127* (2013.01)

(58) Field of Classification Search
CPC .... E21B 43/127; E21B 47/009; E21B 47/008; E21B 43/126
See application file for complete search history.

(56) References Cited

U.S. PATENT DOCUMENTS

| | | |
|---|---|---|
| 4,739,264 A | 4/1988 | Kamiya et al. |
| 4,879,555 A | 11/1989 | Ichikawa et al. |
| 5,666,050 A | 9/1997 | Bouldin et al. |
| 7,107,154 B2 | 9/2006 | Ward |
| 7,703,548 B2 | 4/2010 | Clark |
| 9,033,676 B2 | 5/2015 | Palka et al. |
| 9,140,113 B2 | 9/2015 | Hurst et al. |
| 9,250,069 B2 | 2/2016 | Taylor |
| 9,506,326 B2 | 11/2016 | Hay et al. |
| 9,678,241 B2 | 6/2017 | Zhang |
| 9,952,073 B2 | 4/2018 | Zhao |
| 10,302,510 B2 | 5/2019 | Baker et al. |
| 10,344,573 B2 | 7/2019 | Robison et al. |
| 10,871,056 B2 | 12/2020 | Navar et al. |
| 10,947,833 B2 | 3/2021 | Pons et al. |

(Continued)

*Primary Examiner* — Caroline N Butcher

(57) ABSTRACT

An apparatus for attaching a rotation monitoring sensing device to a rod lift system. The apparatus comprises an enclosure housing a rotation sensor and accompanying electronic processor. The sensing device optionally further comprises a radio transmitter or a wired connection. In some configurations, sensing device may further include a battery and is contained by the housing/enclosure. The sensing device housing resides on or near the rod string of the rod lift system and is configured to minimize height and lateral distance from the rod string. Additionally, an optionally placed magnet may be included in conjunction with the sensing device for installations in which the inherent magnetic field of the rod lift system is not sufficiently detectable. The enclosure may, in this case, contain only a magnet and is configured to hold the magnet safely on the rod lift system.

10 Claims, 11 Drawing Sheets

(56) References Cited

U.S. PATENT DOCUMENTS

| | | | |
|---|---|---|---|
| 11,248,932 | B2 | 2/2022 | Vissiere et al. |
| 11,319,794 | B2 | 5/2022 | Fyfe et al. |
| 11,402,205 | B2 | 8/2022 | Finlay et al. |
| 11,542,938 | B2 | 1/2023 | Zhao |
| 11,592,512 | B2 | 2/2023 | Vissiere et al. |
| 11,815,363 | B2 | 11/2023 | Vissiere et al. |
| 2003/0170072 | A1 | 9/2003 | Gordon |
| 2014/0345947 | A1 | 11/2014 | Wisler et al. |
| 2019/0203579 | A1* | 7/2019 | Phillips .................... G01V 3/40 |
| 2020/0263531 | A1 | 8/2020 | Fyfe et al. |
| 2021/0115914 | A1* | 4/2021 | Zhao ....................... F04B 47/02 |
| 2022/0057235 | A1 | 2/2022 | Müller |
| 2023/0184089 | A1 | 6/2023 | Treiberg et al. |

* cited by examiner

APPARATUS FOR AFFIXING A ROTATION SENSOR TO A ROD LIFT SYSTEM

CROSS REFERENCE TO RELATED APPLICATIONS

This application claims priority to U.S. 63/384,308, which was filed on Nov. 18, 2022, and is titled "Apparatus for Affixing a Rotation Sensor to a Rod and Applications for Rod Rotation Sensing in Existing Wireless Loadcell Systems" by the present inventor, which is incorporated herein in its entirety by reference.

This application also claims priority to U.S. 63/479,728 filed Jan. 12, 2023, and titled "Magnetic Field Sensing of Pumping Unit Stroke Position" by the present inventor, which is incorporated herein in its entirety by reference.

This application also claims priority to U.S. 63/579,003 filed Aug. 26, 2023, and titled "Magnetic Field Sensing of Pumping Unit Stroke Position, Rod Rotation, and Rotator Induced Torque Buildup & Release" by the present inventor, which is incorporated herein in its entirety by reference.

This application uses the inertial sensing device disclosed in U.S. Ser. No. 16/228,233. "Apparatus and Method for Detecting the Rotation of a Rod-String in a Wellbore," by the present inventor, which is incorporated herein in its entirety by reference. The application herein discloses an enclosure for housing the rotation sensor and the attachment configuration to the rod lift system.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

A rod pumped oil well utilizes a long slender bar, or rod, extending down into a wellbore, through production tubing, to actuate a downhole pump. The downhole pump in turn pushes fluid up to surface through production tubing. The wellbore path is not always perfectly vertical. Wellbore deviations, either intentional or unintentional, cause side-load and frictional wear as the rod-string moves linearly/vertically within the production tubing. In order to evenly distribute this frictional wear, the rod-string is rotated at surface by a slow geared rotation mechanism. This rod rotator mechanism is mechanically actuated by the surface pumping unit and is subject to mechanical failure.

The desired rotational action may fail for several reasons. Due to the slow rotation of the rotator, it may be difficult to visually observe a failed rotator. Failed rotation may go undiagnosed for an extended period, resulting in downhole failure. This failure may be a result of the downhole friction which an operational rotator mechanism is intended to mitigate. It is desirable to automatically, and positively, detect failed rotation and alert the operator of the well to this condition so that it may be repaired.

Hurst U.S. Pat. No. 9,140,113 provides a switch-based sensor to count revolutions and determine rotational status. The configuration presented by Hurst has several shortcomings outlined in U.S. Ser. No. 16/228,233. Of particular note in Hurst is the installation requires proper alignment between the sensor and corresponding magnet. U.S. Ser. No. 16/228,233 eliminates this 2-part sensor and associated installation constraints and complexities. This allows the sensor to be quickly installed without regard for alignment or manual calibration. Specifically, as disclosed in U.S. Ser. No. 16/228,233, no prior knowledge of rotational angle per stroke is required and so no configuration of the sensor is needed.

The region in which to attach an inertial sensor, or a magnetic field orientation sensor to the rotating component of a polished rod is limited by the motion of the polished rod through the pump stroke. One approach to sensing, disclosed by Hurst, is to incorporate a switch-based sensor into the rotator mechanism itself. While this addresses vertical clearance and rotational space constraints imposed by the motion of the pumping system, it does not provide a positive indication of rotation in all cases. See U.S. Ser. No. 16/228,233 for an extended discussion of these shortcomings.

U.S. Ser. No. 16/228,233 introduced an approach to positively sensing rotation of a rod-string using inertial sensors (accelerometer, gyro) or a magnetometer. Several sensing devices, incorporating the sensing approach disclosed by U.S. Ser. No. 16/228,233 have since entered the market. These systems are tall and attach directly to the polished rod through a clamping mechanism that assumes a fixed diameter rod. Attaching directly to the polished rod has a fundamental shortcoming of a vertical height clearance which is dependent on the pumping system configuration. In some cases, this may prohibit placing a tall sensor on the polished rod itself. This may limit the ability for the sensing device to operate in all possible pumping configurations. For example, the horsehead may come very close to the polished rod which may impact the sensing device.

Another shortcoming in attaching directly to the polished rod is when the sensing device is placed below the bridle. In this configuration, the sensing device may be smashed either by a rod float scenario, or by a rod part (catastrophic rod break) scenario. A need exists to attach the sensing device in a safe and secure manner. This is not inherently possible in the existing housings on the market because they require the sensor to be attached to the polished rod and can only be attached to a round rod of a known diameter.

Zhao U.S. Pat. No. 11,542,938 discloses a rotation sensor which is very similar to that of Hurst in that it uses a magnet and a proximity switch pickup to count passes of the magnet by the switch. Magnetic proximity switches are limited in that they require a threshold to be exceeded in order to trigger. These switches have no knowledge of orientation or distance beyond a 2-state "near" and "far" based on the presence of a magnetic field, or the absence of a magnetic field. Zhao discloses 2 concepts which are relevant to the current disclosure; "a spring-loaded fixing mechanism" to retain a magnet, and "a u-shaped structure to receive the polished rod".

A spring-loaded fixing mechanism, such as that disclosed by Zhao, may not have sufficient attachment force to hold a large mass in a dynamic and vibrating condition. Certain common well conditions such as "pump tagging" or "fluid pounding" may impart a significant vibration on the polished rod which may dislodge a spring-loaded clamp such as the one disclosed in Zhao. The spring-loaded clamp retaining a magnet resides within the U-shaped structure and is intended to rotate freely. The problem with this arrangement is that vibrations, which may dislodge the magnet and spring-loaded clamp, are likely to result in the clamp and magnet falling downward. In the case of the U-shaped structure, this means the clamp and magnet may contact the lower edge of the cavity within the U-shaped structure. This may result in the magnet being obstructed from free rotation with the polished rod. A need exists to completely separate the housing, from a magnet, such that the magnet cannot contact any non-rotating structure, in any scenario.

The U-shaped structure in Zhao is intended to be a load-bearing structure and the entire device is retained by through-bolts on the open end of the "U". The "U" shaped structure is intended to be the loadcell. Similarly shaped loadcells have been available for some time. Echometer, for example, provides a "horseshoe" loadcell which is a "U" shaped structure. Typical loadcells found on rod lift wells are "donut" shaped and fully encircle the polished rod. This requires that they be slid over the polished rod and requires the upper polished rod clamp(s), coupling, and rotator to all be removed. A rotation sensor does not have this requirement as it does not need to be placed in line with the load bearing components.

The U-shaped structure in Zhao does not contact the polished rod. In fact, if it were to contact the polished rod, the load value which it intends to measure would be invalid as that structure is intended to bear the load through it, not attach to it.

The "U" shaped structure in Zhao does not contain electronics or a battery. These components are located in the main body of the system which is substantially on one side of the polished rod. This is also true of the Echometer horseshoe wireless loadcell. In this configuration, both the Zhao device, and the horseshoe loadcell, are not capable of rotating along with the polished rod. The body enclosing the battery and electronics would be rotationally restricted by the bridle cable. The Zhao device is intended to be rotationally stationary while the magnet rotates in the immediate vicinity of the pickup. This is substantially similar to Hurst wherein that same configuration is applied to a rod rotator mechanism. A need exists to construct a device such that itself may undergo rotation or may be located in a stationary position which does not obstruct the rotation of the system or an attached magnet.

A need further exists to minimize the sensor size such that it may be affixed directly to the moving polished rod, to a clamp used on the polished rod, to a non-encumbered portion of the bridle assembly, to the stationary wellhead, to the stationary stuffing-box, or some other fixed location. Further, an alternative method of sensing (disclosed in U.S. Ser. No. 16/228,233) places the sensor in a rotationally stationary, or a linearly stationary, location and applies a distinct external magnetic distortion onto the rod lift system which may be sensed.

Fyfe US 20200263531 A1 discloses an inertial and magnetic field sensor identical to U.S. Ser. No. 16/228,233. Fyfe claims a priority date of Sep. 12, 2017, based on application U.S. 62/557,627 (Fyfe). As noted in the prosecution of U.S. Ser. No. 16/228,233, the original Fyfe application does not disclose relevant content related to the means of rotation sensing. The date in which this content entered the application is Sep. 12, 2018.

FIELD OF THE INVENTION

The present disclosure relates to the field of hydrocarbon recovery operations. More specifically, the present invention relates to the production of fluids from a wellbore using artificial lift and in particular to rod pumped wells. The invention also relates to an apparatus for detecting the mechanical rotation of a rod-string during operation of a surface pumping unit. Further, the sensing device may be further adapted to detect rotation of a tubing string which is fully encapsulated by the wellbore. A means to construct and attach a sensing device housing to the rod lift system, and various possible sensing positions and configurations are provided.

The present disclosure provides an attachment and housing for an inertial, or magnetometer-based rotation sensor. An alternative attachment for a distinct magnetic component is provided if the existing magnetic field of the system is insufficient for determining rotation. The attachment and housing for these two embodiments is achieved by minimizing the size of the enclosure in both the vertical sense (how tall the enclosure is), and the rotational or horizontal sense (how far from the polished rod the enclosure protrudes during rotation).

A company named Hawkiiii (related to Fyfe U.S. Pat. No. 11,319,794) was developing a rotation sensing device utilizing the inertial sensing approach disclosed in U.S. Ser. No. 16/228,233. Not much is known about this device as the company dissolved before reaching commercial status. A user manual is provided, but details of the rotation sensor housing and attachment are not available. The rotation sensing device is thought to be a plastic enclosure, similar to that of the dynamometer housing depicted in the manual. It is believed to be attached to the polished rod through a distinct clamping mechanism incorporating at least 2 clamps. This sensor does not appear to be suitable for attachment around a standard polished rod clamp and is believed to only attach to the round polished rod.

More recently ChampionX (related to U.S. Ser. No. 17/549,519) has developed and marketed a rotation sensing device utilizing the inertial sensing approach disclosed in U.S. Ser. No. 16/228,233. A user manual for this device is provided and illustrates it is substantially tall and utilizes at least 2 distinct clamping mechanisms at the upper and lower ends which extend past the main body of the sensing device housing. As such, the sensing device requires a lengthy exposed section of the polished rod, either above or below the bridle. Further, this exposed section must be free of external component motion during the entire stroke of the pumping system, and through the entire rotation of the rotator system.

More recently WSI (application filing unknown) has developed and marketed a rotation sensing device utilizing the inertial sensing approach disclosed in U.S. Ser. No. 16/228,233. Pictures are provided and illustrate an enclosure that is substantially tall, and substantially protrudes from the polished rod. The attachment of this device in the tradeshow demonstration appears to utilize a single zip-tie. This single zip-tie is placed at the top of the housing and allows for a significant free-hanging mass below. Furthermore, there is no support on the backside of the enclosure to ensure the sensor is stable and positively affixed to the polished rod. The aforementioned Hawkiiii and ChampionX devices achieve this stable support by using 2 clamps which center the sensor vertically on the polished rod.

Presented herein is a device that minimizes the sensor's overall vertical height, constrains the lateral (rotational) footprint around the polished rod, optimizes the center of mass, and is suitable for a single attachment mechanism on several different diameter polished rods, attachment to an irregular shaped polished rod clamp, the bridle cable, the wellhead, or stuffing-box. One embodiment of the present disclosure utilizes a single zip-tie or band-clamp and is placed approximately about the center of mass or vertical center.

TECHNOLOGY IN THE FIELD OF THE INVENTION

U.S. Ser. No. 16/228,233 discloses a self-contained apparatus for detecting rotation using at least one of a magnetometer, an accelerometer, a gyro, or by monitoring RF signal quality. The sensing device is intended to be installed on an operational pumpjack. In particular, the device is to be attached closely to the polished rod where it undergoes rotation along with said rod. There are several means to attach such a device to a rod; a bolt-type clamp, zip-ties, worm drive band-clamp, adhesive, safety wire, etc. Existing sensing devices which use a similar inertial rotation detection mechanism (introduced after the priority date of U.S. Ser. No. 16/228,233) are placed in a generic enclosure and attached to the polished rod. These enclosure configurations have dimensional limitations with respect to their installation locations. Specifically, they are excessively tall and protrude horizontally in the area of rotation.

The present disclosure concerns the attachment of the sensor and the configuration of the sensor's internal components in such a way as to minimize height and optimize the attachment mechanism. In both Hawkiiii and ChampionX, there are a pair of vertically spaced clamping mechanisms to provide the necessary lateral stability. In both of these cases, the sensing device is relatively tall. Because a dedicated wireless rotation sensor is intended for constant use, and must function for many years, a reasonably sized battery is used. Typical batteries are taller than they are wide which results in a tall sensor housing, when the battery is placed in the common and expected vertical orientation.
Rotation Detection Using Receive Signal Strength Radio Signal Strength monitoring to determine rotation, presented in U.S. Ser. No. 16/228,233, is applicable to an existing system, namely a wireless loadcell and associated receiver. The wireless loadcell provides a transmitter and can be positioned such that it undergoes rotation along with the rod string. The receiver can then be implemented to observe the signal strength and determine if rotation is in fact occurring at the point of transmission as the transmitter is periodically obscured by the polished rod and changing direction of the transmitting antenna. The housing of such a transmitter would be optimally placed in a material that would allow radio waves to propagate. This typically would be a plastic or rubber enclosure. A metal enclosure would block an internal transmitter and so an external antenna would be required. The sensing device will be placed in a classified hazardous environment and so careful consideration must be made with regards to certification of the electronics for operation in this environment.

In configurations where a wireless data connection is used for conveying data from the rotating system to a stationary receiver, the antenna may take several forms; an internal PCB antenna; an internal antenna but separate from the circuit board; or a distinct external antenna. The transmitter may be any radio that is rotationally bound to the polished rod and is not necessarily a dedicated sensing device for distinctly and directly monitoring rotation. A wireless loadcell mounted in a manner in which its transmitter is rotating with the polished rod would achieve the goal of providing a monitorable signal of cyclically increasing and decreasing strength. In fact, any transmitter affixed to a rotating member would provide a signal which could be monitored for the cyclically increasing and decreasing strength indicating rotation.

BRIEF SUMMARY OF THE INVENTION

An apparatus for housing and attaching a sensing device for monitoring a reciprocating rod lift system is provided herein. The apparatus is designed to detect rotation of a polished rod associated with a wellbore. This detection may be from the rotation of the sensing device itself or may be determined from detecting a rotating magnetic field in the vicinity of the sensing device. The sensing device further detects linear motion in the up and down directions. The polished rod is connected to a traditional rod-string or a continuous rod-string that extends from a well head into the wellbore. The polished-rod and rod string are rotated using any known rod rotation mechanism. A tubing string may be similarly rotated.

If the sensor is to be placed directly on the polished rod, as disclosed in U.S. Ser. No. 16/228,233, there are only 2 practically suitable regions: above or below the bridle assembly. The bridle assembly typically consists of the carrier bar, loadcell, rod rotator, and one or more polished rod clamp(s). These are all stacked and held by gravity and friction. As such, the only remaining part of the exposed polished rod is either below; between the bridle assembly and wellhead, or above; between the rotator mechanism and the top end of the polished rod. The upper end of the polished rod may be constrained by the pumping unit horsehead during the stroke, or during the rotation of the polished rod by the bridle cables.

The polished rod clamp may also be an option for placement of the sensor. There is always at least one polished rod clamp above the bridle, as that bears the weight of the entire rod-string and transfers that load onto the bridle. In some instances, there may be one or more polished rod clamp below the bridle. In the present disclosure, the distinct sensing device housing may be attached to either the polished rod, or around the polished rod clamp, without need for alteration of the housing or attachment mechanism.

Certain catastrophic failures of the lift system can result in significant damage to a sensing device placed directly on the polished rod itself. One example would be a polished rod break. Typically, the break occurs at the first clamp above the rotator table as this is a fatigue point. If the sensor is placed on the polished rod above the clamp, there is a risk of the sensor falling when a break occurs. This may seem innocuous, but if the sensor contains a battery, there is a significant risk of fire due to battery damage. This is more concerning if the sensor is placed on the polished rod, below the bottom clamp. Typically, a secondary clamp is placed on the polished rod below the carrier bar such that it will catch the entire weight of a free-falling rod-string if there is a break at the main clamp. In some cases, due to pumping system geometry constraints, the sensor may be placed in this lower region between the clamp and stuffing-box. If a polished rod break occurs, the sensor would be smashed, and battery destroyed. This presents a significant fire risk as a crushed battery chemistry may cause a fire, or may at the very least generate a spark, which could trigger a fire in the hazardous environment near the wellhead.

Mitigations to the fire risks may involve battery chemistry, but when faced with a catastrophic failure, the fundamental risk is an exposed spark in the possible presence of flammable wellhead gas. Alternatively, the sensor may be placed around the outer surface of the lower clamp, such that it would not be damaged by the free-falling rods. This requires the sensing device to be shorter than the attached polished rod clamp such that the polished rod clamp would bear the mechanical impact. Likewise, the sensor may be placed around the main polished rod clamp, but again, this upper section itself may fall, although without the additional weight and force of the entire rod-string. The sensing device may alternatively be placed on the bridle assembly itself, such as on the bridle cable. An optional magnet may be placed on the polished rod which would not create a fire risk in the event of a catastrophic polished rod failure.

Another concern in placement of the sensor on the upper region of the rotating polished rod is the lateral clearance. This is the horizontal distance from the center of rotation. In the region above the bridle assembly, rotational area is laterally constrained by the bridle cables on either side. In most cases these are sufficiently far from the polished rod to afford enough room for a sensor to freely rotate. Devices such as Hawkiiii, ChampionX, and WSI are designed to be placed on the polished rod itself and may not be suitable for placement on the larger and irregularly shaped polished rod clamp. One configuration of the presently disclosed sensing device locates the battery perpendicular to the electronic components, which minimizes the radius of the sensing device around the center of the polished rod. A perpendicular arrangement of the battery is not necessarily required as one could construct the battery and electronics in a parallel arrangement, while maintaining a compact system. The perpendicular configuration is however a convenient means to minimize the constraints of both height and lateral protrusion, while at the same time allowing for irregular attachment to a non-circular body (i.e. a polished rod clamp).

The rotator assembly, as disclosed in Hurst, is not the optimal location for rotation sensing. As discussed in U.S. Ser. No. 16/228,233 the rotator may be functional, but the rotational action may not be transmitted fully to the rods themselves. The sensor could be affixed to the rotator assembly as depicted in Hurst, but preferably the sensor would be attached directly to a component which is positively attached to the rods under rotation. The sensor presented in U.S. Ser. No. 16/228,233 is entirely self-contained, whereas the Hurst sensor requires a two-part sensor and magnet in proper alignment.

The discussion of a secondary magnet herein is optional. If the magnetic field of the existing mechanical system is insufficient to determine a distinct field and the relative orientation of that field, a magnet may be used to improve the detectability of that component. A distinct magnet is also not dependent on the configuration, position, alignment, or proximity of the sensing device as the magnetometer is capable of determining these parameters and calibrating the sensitivity accordingly. A magnet is only required if the existing field does not provide enough of a signal to detect. A steel component of the rod lift system may also be intentionally magnetized through several known processes.

The sensing device utilizes a continuous magnetometer and so it may sense the earth's magnetic field, or it may sense one or more localized magnetic field distortion. The pumping unit has a multitude of local field distortions and so it is a challenge to discern the background magnetic field of the earth during operation. This process is disclosed in U.S. Ser. No. 16/228,233. A distinct magnetic field may be added to the system and still retain the fundamental sensing approach disclosed in U.S. Ser. No. 16/228,233. One configuration would be to place a magnet on the rotationally bound bridle assembly. The sensor, affixed to the rotating polished rod, would see this field as it rotates through it, much in the same way as it would (and still does) see the background field of the earth. In this case, the field strength would be stronger and thus easier to discern. Further, it is traveling linearly in conjunction with the sensor and so the problem of field distortions through the stroke is diminished. The relative field strength of a nearly placed magnet is not a requirement but may be used to improve results or expand the applicable placement of the sensing device on the rod lift system.

Alternatively, a distinct magnet may be placed on the rotating polished rod, or polished rod clamp, while the sensor is located on the rotationally stationary bridle. This is different from Hurst or Zhao in that both of those disclosures use a discrete switch in conjunction with a magnet. This makes alignment challenging and, in both Zhao and Hurst, they require a carefully crafted system to ensure close alignment. In the case of a continuous 3-axis magnetometer (U.S. Ser. No. 16/228,233), the sensor can determine the required sensitivity from the measurements and calibrate itself such that alignment and proximity are not critical. In other words, the sensing device determines state from the rotating magnetic field. Further, this does not require careful alignment on install, nor does it require maintaining this careful alignment.

There are added benefits of placing the sensing device on the rotationally stationary bridle and magnet on the rotating polished rod. These benefits include the ability to determine torque-induced rotational binding in the rod-string (disclosed in U.S. Ser. No. 16/228,233) and reduced exposure in the event of a polished rod break. If the polished rod breaks and the upper polished rod section falls, there is no additional fire risk because the only component on that section of rod would be a passive magnet. The sensing device (containing the electronics) would safely remain on the bridle assembly. A bridle cable break could still occur, but these are generally less common as there is visual evidence prior to a break and generally results from poor inspection or maintenance. A polished rod break on the other hand is from internal fatigue which is not entirely visible or evident prior to a break.

Still another possible installation configuration is to place the sensing device on the stationary wellhead (on or near the stuffing-box) and place a magnet on the moving and rotating polished rod. This illustrates the distinct difference between the current disclosure and that of Hurst or Zhao. The magnet is both moving linearly, in and out of sensing range, and also moving rotationally. Because Hurst and Zhao use a distinct switch-based detection, these would be unable to determine linear motion from rotational motion from that discrete switch. A continuous magnetometer can however determine each of these signals from the measurements. In other words, it can determine short-term signals indicative of linear stroking motion, and long-term signals indicative of rotational movement. This is because the magnetometer sensor is reading both a strength of the field and the orientation of that field. The combined signal read by the magnetometer may be processed to identify each of these individual signals (linear motion and rotational motion). In fact, there is a distinct utility in determining linear motion in this manner, and is the subject of U.S. 63/479,728, U.S. 63/579,003 and U.S. 63/586,298.

Placement Above the Rotator Mechanism

When the rod-string is installed, excess polished rod remains above the upper polished rod clamp. The pumping unit horsehead may encroach on this portion of the polished rod at the top of stroke. While the horsehead does not generally touch the excess polished rod, there may be insufficient lateral/rotational clearance for an externally placed sensor on the surface of the polished rod, above the top polished rod clamp. The configuration of the proposed sensing device housing would also be suitable to attach to the polished rod clamp itself. This can be accomplished by treating the polished rod clamp as a large diameter, oddly shaped, rod. By attaching either to the polished rod itself, or optionally to (or around) the polished rod clamp, the installation can be optimized for the available vertical clearance. In some cases, the sensing device may be attached to, or threaded into, a polished rod coupling at the top of the polished rod. Typically, a coupling is left on the top of the polished rod to aid in lifting the entire rod-string by a workover rig or crane. This provides an additional possible point of attachment to the sensing device.

During normal operations, the horsehead approaches the exposed upper section of the polished rod. By placing the sensing device directly on top of (and in-line with) the polished rod, into the coupling, the sensing device would be safe from the approaching horsehead. This would require the sensing device to be no larger than the diameter of the polished rod or coupling. Height in this specific configuration is not a concern because the sensing device would be placed directly in the axial footprint of the polished rod. This is different from the common attachment "around" the polished rod. When the sensing device is attached "around" the upper section of polished rod, the clearance of the horsehead is a concern as its approach may crush the sensing device or may impede the free rotation of the sensing device with the polished rod.

Means of Improving Attachment Stability

The disclosed sensor housing is suitable for various sizes and shapes of components on which it is to be attached to. The polished rod is round, whereas the polished rod clamp is eccentrically shaped. The sensor housing may be placed directly on top of, or around, the upper polished rod where gravity would beneficially hold it vertically down on the polished rod clamp, while the zip-tie retains the sensor onto the polished rod. This ensures that vibration and other mechanical motion does not substantially move, or "shake loose", the sensor when attached. A zip-tie alone may be sufficient to hold the relatively small sensor in place without a horizontal surface (i.e. top of the polished rod clamp or rotator table). The sensing device may be freely positioned on the polished rod or polished rod clamp. In addition to the attachment, the sensing device may also rest on top of the polished rod clamp or on top of the rotator table to provide additional stability.

Placement Below the Bridle

The sensor may alternatively be placed below the carrier bar. In this case the vertical clearance is constrained at the bottom of stroke where the carrier bar and top part of the wellhead (typically the stuffing-box) are closest. If the sensor is too tall at this location, it would be smashed between the carrier-bar (above) and stuffing-box (below). This clearance is known at the time of installation. In some instances, this distance may change if a different crank-hole is selected to change the pumping unit stroke length. This is a significant change and so the placement of the sensing device would likely be considered as part of this. Lengthening the stroke length may result in a reduced exposed length of polished rod and so the sensing device may no longer be suitable for attachment in that same region.

It is desirable to construct the rotation sensor in such a way as to minimize its vertical height as well as its diameter, or footprint, around the rotational path of the polished rod. The sensing device may also be attached around a lower polished rod clamp, if available. Vertical height, in this arrangement is only a concern if the sensor housing is taller than the polished rod clamp. The preferred embodiment is smaller in the vertical dimension than a typical polished rod clamp. Horizontal rotational footprint, or the distance from the center of the rotating polished rod, is less of a concern in this region below the bridle.

The sensing device disclosed in U.S. Ser. No. 16/228,233 generally consists of a circuit board (PCB) containing the individual sensors and a processor. The device may further include a radio and may also contain a battery. The circuit board and battery represent the largest distinct internal components. Batteries are typically oblong, or taller than they are wide. To minimize overall vertical height, in one embodiment, the battery is placed horizontally. This is counterintuitive because the polished rod is long and slender, and so one would expect to place the long slender battery in parallel. Examples of both the Hawkiiii and ChampionX sensors indicate a taller housing and vertically placed battery. The battery placement herein is perpendicular to the axis of the polished rod, or horizontally placed relative to the vertical polished rod. This horizontal and perpendicular configuration is not a strict requirement as the battery may be placed vertically, or at any arbitrary angle to achieve the desired size and attachment requirements. Placing the battery and PCB in this configuration is beneficial over the existing devices.

Dimensions of the circuit board containing the necessary electronics, radio, antenna, and sensors, are flexible in design. The overall circuit board dimensions would preferably be of similar (or smaller) size as the battery to provide a symmetric housing. The placement of the PCB (containing the sensors, processor, and optional radio/antenna) is perpendicular to both the polished rod and perpendicular to the battery. Placement angles do not necessarily need to be perpendicular, only to create a receiving "cradle" for the member in which the housing is to be attached. This creates an angle to the enclosure that contacts the polished rod on 2 sides. A 3rd opposing contact point is provided by a flexible band such as a zip-tie, metallic band-clamp, safety wire, rubber, or other strapping mechanism, and provides a stable attachment point.

For a wireless sensing device, the battery and PCB may be placed on the same side as in both the Hawkiiii and ChampionX sensors. The radio, with an embedded PCB trace antenna must transmit and have an unobstructed path. This means the battery would need to be behind the PCB; between the polished rod and PCB, or an external antenna would be required. Or, the battery and PCB may be placed next to each other, as appears to be the case in both Hawkiiii and ChampionX sensors. This is only required for sensing devices that utilize a wireless link. Wired sensing devices do not have this RF transmission constraint but introduce restrictions of where the device may be placed due to rotational constraints on the power/data cable. In other words, a wired sensor would need to be placed on a non-rotating component.

Alternatively, the battery and PCB could be placed vertically and either side-by-side, or perpendicular. This would increase the sensing device height but may not substantially affect the lateral radius. Examples of such configurations can be found in the ChampionX or Hawkiiii sensor. In both of these sensors the battery and electronics are completely on one side of the polished rod. In both devices a separate component is used to provide the clamping action where the sensor housing is stood off from the polished rod. A technical motivation for spacing a magnetometer from the polished rod is calibration of the sensor itself. When a magnetometer is placed close to a steel bar, which itself potentially holds a magnetic field, the calibration and sensing accuracy of said magnetometer becomes a challenge. Likewise, placing the battery near the magnetometer may also cause magnetic field distortions. Further, when using a gyro to determine instantaneous rotation, it is desirable to offset the sensor such that it may experience greater rotational and inertial forces.

U.S. Ser. No. 16/228,233 provides a detailed method for calibrating the magnetometer in the complex magnetic field environment created by the moving mechanical pumping system. With the previously disclosed method of calibration, closely placing the magnetometer to the polished rod becomes less of a concern as the calibration compensates for the severely distorted magnetic field. This allows the configuration of the sensor housing and closely spaced steel rod and magnetometer sensor provided in this disclosure.

Of note here is the housing itself, in the present disclosure, is constructed in a way that it is an integral part of the attachment mechanism. The angled configuration then attached to the polished rod. There are several ways to achieve this attachment; a swingout clamp, a sliding clamp, a strap, etc. In the interest of installation simplicity, a UV and temperature stabilized nylon type zip-tie is the preferable option for its simplicity and ease of use, but other attachments may be used. Because the angled enclosure provides 2 stable points of contact, it is suitable for a wide range of polished rod diameters or irregularly shaped members such as a polished rod clamp. The remaining challenge is to position the zip-tie such that it holds the sensing device housing against the polished rod or polished rod clamp. It is also desirable to construct the housing is a manner that is easily manufactured. Injection molding is the preferred manufacture method, but 3D-printing or traditional machining would also be suitable. If a rubber housing is used, a technique known as compression molding may be used. In other configurations, the electronics may be placed in a sealed metallic pipe nipple with wired connectors, or with a permanently attached cable.

In some cases, a rubber enclosure may be preferred as this could eliminate the need for a distinct attachment mechanism. One example would be the polished rod clamp, which is an irregular shape. A rubber housing could be constructed to "fit" around the polished rod clamp in a way similar to how a cellular phone case "snaps onto" the body of a phone. This could be done on the round polished rod, but since the desire is to determine rotational status, a sub-optimal state such as significant vibration may cause a rubber housing "snapped" on to the rod to inadvertently rotate, or not rotate, in conjunction with the rod itself. The polished rod clamp eliminates this concern because of its eccentric shape. In other words, a device connected to a round rod may easily "slip" rotationally, whereas a device connected to a non-round component would not.

Attaching just a magnet using a rubber housing may be preferable as the mass of the magnet is small compared to the sensing device with its battery and associated electronics. The size of the magnet is also much smaller than the sensing device and so a rubber housing may be constructed in a compact manner. This may also enable a stretched configuration wherein the housing is pulled around the attached member. This could be accomplished with the main sensor housing using a rubber band, for example. In the case of a magnet, the magnet may be attached directly, without any housing. This creates a risk of dropping the magnet in or around the wellbore and so an encapsulating housing, surrounding a magnet, may aid in safety or identifying the magnet to field personnel. A magnet my even be incorporated in the compression or injection molding process such that the resulting housing fully contains the magnet.

A magnet may also be incorporated, permanently, into some component of the rod lift system. This would be particularly beneficial in the case of a tubing rotator where the entire assembly is encapsulated by the wellhead and casing and so an external attachment would be impossible. A magnet may be incorporated into a polished rod clamp, a bolt, or a nut. Alternatively, the clamp, bolt, or nut, itself may be magnetized. Again, a distinct magnet is only needed in cases where the inherent magnetic field of the component which is desired to be sensed is not sufficient to be determined by the magnetometer.

Attachment Using a Zip-Tie

To position the zip-tie in such a way as to provide an opposing force against the 2 housing contact points on the inner angle, the housing is undercut through those contact points and guide pins are provided to hold the zip-tie away from the polished rod in those areas. The force of the cinched zip-tie is then directed to the opposing side of the polished rod relative to the housing contact points. In other words, the zip-tie pulls the attached member into the sensor housing "cradle" created by the housing angle and undercut. The housing is taller than the zip-tie, so the housing itself provides stable points of contact to hold itself rigidly against the polished rod, polished rod clamp, bridle cable, or other member. The overall housing is wider than it is tall, and so the center of gravity is close to the points of contact and zip-tie.

The undercut and guide pin for the zip-tie configuration is only required when the sensor housing body is larger than the polished rod diameter. This is typically the case as the battery, placed horizontally, is wider than the polished rod diameter. A vertically placed battery and PCB may be radially small enough such that a zip-tie placed around the entire sensing device would hold the sensing device against the polished rod. It is noted here that the angled configuration is not strictly required. A single zip-tie is an innovative process when used in conjunction with the undercut and allows a housing that is bigger than the component in which it is to be attached. The outer diameter of a sensor housing may be larger than the diameter of the polished rod and therefore a zip-tie must be positioned on a smaller portion of the housing, in this case, through the undercut and held by the guide pins. A substantially smaller sensor and battery may be used to facilitate a circumferentially applied zip-tie. In other words, the zip-tie may alternatively encompass both the outer surface of the sensing device enclosure and the attached member.

The zip-tie placed through an undercut also has the added benefit of securing the zip-tie during installation. In other words, the zip-tie is held loosely by the undercut passage such that it would not inadvertently fall during installation. This greatly simplifies the installation process because the installer can accomplish the task with a straightforward motion. The sensor housing, with the zip-tie secured in place, is held to the member in which it is to be attached. The free ends of the zip-tie are then drawn together and pulled to secure the sensing device. If the zip-tie were left as a loose component, the installer would have to position the housing, while also holding the zip-tie, and attach the free ends of the zip-tie all at the same time.

If the sensor is to be attached to a polished rod clamp, the zip-tie (or other surrounding clamping mechanism) could be placed around the outside of the sensor housing. The presently disclosed structure of the housing with an inner undercut would be suitable for installing on a polished rod clamp as well. In other words, the present disclosure could be installed directly on the polished rod, onto a polished rod clamp, onto a bridle cable, wellhead or several other components of the rod lift system, without additional alterations. The zip-tie or strap may utilize an undercut section of the housing or may be applied around the outside of the housing.

Stabilizing the Sensing Device

Alternatively, a tab extending from the enclosure may allow the zip-tie to externally hold the sensing device housing against the polished rod. If the tab is above or below the housing, a second tab might be required on the opposite side to provide stability. This may require 2 separate zip-ties to provide stability. Because the preferred configuration places the zip-tie in the vertical center, only one zip-tie is required while the housing is held stably about its center of mass. In other words, one or more zip-tie, band clamp, or other strapping mechanism may be used, but only one is required.

The points of contact provided by the undercut, guide pins, and housing "cradle" provides a stable contact geometry and is easily installed and removed. It is desired to hold the sensing device secure to the rotating member. If the sensing device is moved or loose, the readings may be compromised, and this may result in a false reading. The case of a loose sensing device that utilizes a magnetometer may generate a false rotation signal. In general, a magnetometer based rotational sensor is less susceptible to false readings from a loose attachment, provided on average, the sensing device is roughly bound to the attached member. A gyro-based rotation sensor on the other hand, is more likely to falsely detect rotation from a loose attachment as the angular velocity would be altered by the loose attachment.

The sensing device does not experience any external load beyond inertial forces from pumping motion or stroking action. These inertial forces may be substantial in some cases and so a tight and secure fastening mechanism is preferred. A zip-tie may not be sufficient in all cases. A metallic band-clamp or mechanical clamping arm may be substituted to achieve a higher clamping force. The undercut and guide pins may be constructed in a way to handle either zip-ties, metallic band-clamps, or other strapping mechanisms. The sensing device may also rest on a flat horizontal surface to further distribute and stabilize the sensing device mass. The strap or clamp would be used as normal, but the sensing device would be additionally supported by gravity. The sensing device may be placed directly above the upper polished rod clamp such that it rests on the top surface of the polished rod clamp. Alternatively, the sensing device may be placed around the polished rod clamp and rest on the rod rotator table.

By placing the sensing device around an attached member, and additionally rest on top of another component, the stability of the sensing device may be greatly improved. Inertial forces during the pumping cycle may be substantial. A condition known as pump "tagging" or "fluid pound" may create a sharp vibration on the sensing device. This may cause the zip-tie to slip. This vibration is primarily in the linear up and down direction. Additionally, significant rotational vibrations or accelerations may also dislodge the sensing device. Over time, this is likely to cause the sensing device to slip down with gravity. Conveniently, the sensing device may naturally end up resting on a component such as a polished rod clamp or rotator table. This is likely to only occur in a positive manner of the sensing device is attached to the polished rod on or above the upper polished rod clamp.

Manufacturing of the Enclosure

Manufacturing through injection molding uses a side action mold to create this undercut for the zip-tie. This side action opposes the outward facing surfaces which can be embossed for a direction arrow, logo, or other text that will be visible on the sensor housing side when installed. Examples of possible housings are provided in the attached illustrations. Distinct pins are used for holding the zip-ties, but these features may be integrated into the mold such that the undercut passage would direct the zip-tie away from the inner side of the attached member.

The enclosure is to be placed outdoors and should be sealed from rain and the elements. Injection molding also provides a solid continuous enclosure on both the top and sides so that fluids or dirt would be directed away from the internals by gravity. The enclosure only needs to be sealed on the underside. Vibration and hazardous environment concerns may dictate that the PCB board and battery be sealed with an epoxy resin. The unitized enclosure makes pouring the epoxy a repeatable and automatable process. If the internals are not epoxied, a cover plate may be installed on the underside to seal the sensor housing. This lid may not be required if the inner components are epoxied into the enclosure. Such a cover plate, or lid, could be similarly injection molded, laser cut, or otherwise manufactured to the desired shape. Preferably the cover plate would be recessed in the housing so that rain or other external contaminants would be naturally directed away from the sealing interface by gravity.

The holes for the guide pins, which will direct the zip-tie geometry, may be created during the injection molding process. These holes could be drilled or otherwise created as part of the manufacturing process. These guide pins do not necessarily need to be distinct components. They may be integral features of the housing such as tabs, through holes, or molded slots or passages. The intent is to create a single piece housing, but as with the lid discussion above, the housing may comprise 2 or more distinct pieces that are assembled to create the enclosure. This multi-piece assembly may create the passages or guides for the zip-tie (or other strapping mechanism).

Preferably at least 2 opposing pins or retaining features are provided to ensure optimal angular positioning of the zip-tie to pull the sensor housing into the polished rod or attached member. If only a single guide pin were used, the forces pulling the polished rod into the housing would be sub-optimal as the angles of the zip-tie and resulting force would be applied to the near side of the polished rod. A single guide pin is a minimum requirement, but 2 pins positioned on opposing sides of the undercut are minimally optimal to direct the forces onto the far side of the polished rod to ensure stable attachment. A single retaining point may be sufficient if the attached member is large enough, but this cannot be relied on for all possible configurations.

Because multiple polished rod diameters (or other attached members such as a polished rod clamp) are possible, multiple pins may be provided through the undercut. Likewise, for the installation on a polished rod clamp, additional pins may provide an alternate attachment point for the larger diameter around the polished rod clamp. An additional pin may also be provided in the inner corner to keep the zip-tie away from the polished rod on the backside. This is only a concern for small diameter polished rods that reside closer to the inner corner of the housing "cradle". The multi-pin configuration allows the installer to select the appropriate pin for the installation diameter (polished rod or polished rod clamp). For small diameters, the inner pins would be used. For larger polished rod diameters, the zip-tie would be directed around all pins. Distinct pins are not required, but in the configuration where the zip-tie passes through an undercut in the housing, some mechanism needs to hold the zip-tie, band-clamp, or other strapping device away from the near side of the polished rod such that the force pulls the attached member against the housing.

The presented enclosure allows a stable attachment with a single zip-tie (or metallic band-clamp, or other strap type mechanism). This allows the installer to affix the sensor in one motion. Likewise, removing the sensor can be done with a single cut of the zip-tie. The angle provided by the undercut and support pin provides a limited exposed portion of zip-tie that may be cut with a standard pair of wire cutters. That segment of exposed zip-tie is protected as it is between the sensor housing and the polished rod, but the pointed head of the wire cutters fits in this gap. This makes removal a straightforward process with a common tool.

Sensing Rotation of the Polished Rod Through a Rotationally Stationary Loadcell

Another approach to the housing of a rotation sensor would be to integrate the magnetometer into the loadcell. Alternatively, a gyro, or an accelerometer, could be used for rotation sensing and likewise integrated into the loadcell. In some loadcell configurations, a gyro or accelerometer may be present for the purpose of determining linear stroke position through a double integration process of acceleration to velocity and again to position. Gyros or accelerometers have not been previously used for the determining rotation within a loadcell. This integration of a magnetometer, a gyro, or an accelerometer would create a combined wireless loadcell and rotation sensor. The sensing device could be battery powered and wireless, as disclosed in U.S. Ser. No. 16/228,233, or may be integrated as a wired sensor utilizing and repurposing the existing loadcell cable. The magnetometer, accelerometer, or gyro (or combinations of these sensors) used for rotation sensing may be placed in an existing housing for the electronic components of a wireless loadcell. In the case of a wired loadcell, the proposed enclosure would act as an inline connector between the loadcell and automation controller. In general, the wired configuration would require the sensing device to exist in a rotationally stationary location on or near the bridle assembly because of the rotational footprint restriction created by the bridle cables on either side.

U.S. Ser. No. 10/302,510 B2 (Baker) discloses a wireless loadcell assembly. Baker does not disclose rotation sensing but does describe the polished rod is free to rotate within the loadcell. Likewise, the loadcell itself is free to rotate with the polished rod. A traditional wired loadcell requires an anti-rotation device so that the cable will not become wrapped around the assembly. Because the Baker loadcell is wireless, it does not require the anti-rotation device and may be placed above the rotator such that it rotates with the polished rod.

Yet another approach would be to integrate the magnetometer into the loadcell but position the loadcell in a rotationally stationary configuration, under the rotator, as a typical placement of said loadcell. In this case, the magnetometer would not be observing its orientation within the earth's magnetic field as it is rotationally stationary with respect to that field. Rather, the magnetic field of the polished rod itself or an optionally attached magnet would provide the field sensed by the magnetometer. The magnetic field of the rod-string is highly variable from one installation to another, but there is consistently "some" degree of magnetization of the rod-string. The rod naturally extends into the earth and thus conducts some amount of magnetic field. An external magnet may be attached along the polished rod, along the bridle assemble, or at the stationary stuffing-box or wellhead to increase this magnetic field and to provide a stronger and more distinct magnetic field to sense.

A loadcell with an anti-rotation device is known to be stationary even when the rods are rotating. In this configuration, a magnetometer placed in the loadcell would observe the rotation of the magnetic field of the polished rod. This is functionally equivalent to the disclosure in U.S. Ser. No. 16/228,233, but the frame of reference is inverted. Instead of the device changing orientation within the static magnetic field of the earth, the magnetic field, originating from the polished rod (and an optionally attached magnetic distortion) is changing orientation relative to the statically positioned magnetometer.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
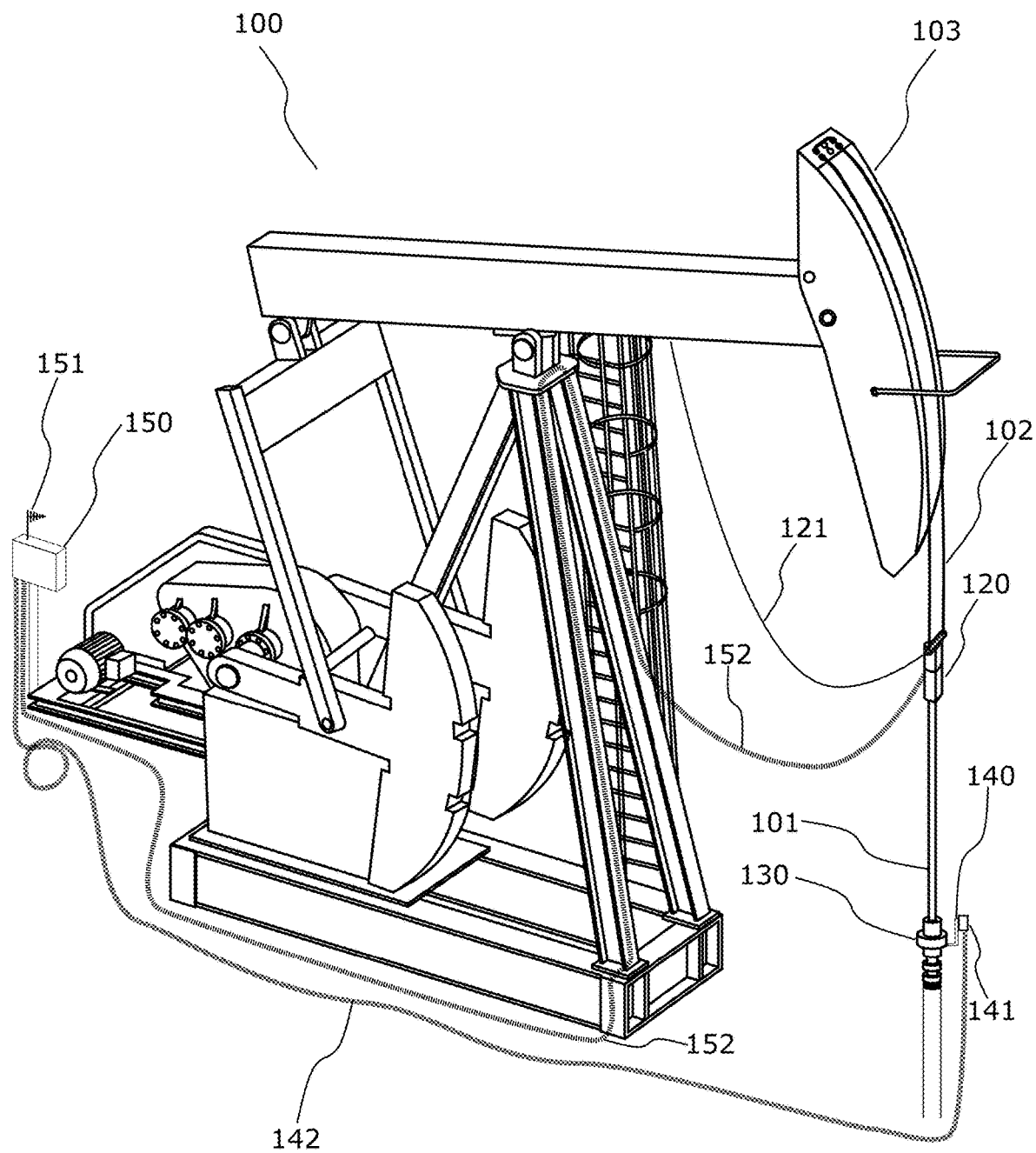
FIG. 1 provides an overview of the rod lift system. The embodiment wherein the sensor is placed on a fixed location at the wellhead is shown. This specifically shows a wired sensor, but a wireless sending device may be used. Additionally, the sensor may be placed on the moving components and are further detailed in the subsequent drawings.

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, carbon dioxide, and/or sulfuric components such as hydrogen sulfide.

Rotation generally refers to the rotation about a vertical axis. Specifically, rotation refers to the polished rod and rod-string are generally oriented vertically at surface. Tubing may be similarly rotated. Other components of the rod lift system may undergo partial or full rotations, but these are of a different nature. The walking beam rotates over a horizontal axis. This oscillating rotation transfers into vertical linear motion of the polished rod. This stroking motion in the linear direction actuates the rotator mechanism so that the rods may rotate around this vertical axis. While the side-to-side motion of the walking beam is mechanically linked to the perpendicular rotational action of the polished rod, this mechanical linkage can fail. The main crank arm of the gearbox also rotates, but this is not the rotation of interest in this disclosure.

Rotation sensors are defined in U.S. Ser. No. 16/228,233. A magnetometer is a device that provides a continuous measure of magnetic field strength in one or more directions. A magnetometer is equivalent to a compass for the sake of describing orientation about a vertical axis. A barometric pressure sensor can be used to determine height or elevation.

The sensing device is enclosed in a housing. These terms of "housing" and "enclosure" may be used interchangeably as they refer to the same basic concept of an object used to protect the actual sensor(s) and electronics. This housing is further used for the attachment of the sensing device to the rod lift system and is constructed for this dual purpose; to both contain the electronics and securely attach the device.

A magnet may be used to increase a local magnetic field distortion that may be sensed. U.S. Ser. No. 16/228,233 discusses soft iron and hard iron magnetic field distortions in the context of calibration. A magnet is a hard iron distortion. As disclosed in U.S. Ser. No. 16/228,233 the components of the rod lift system may accumulate a magnetic field and so a separate and distinct magnet is not a necessary requirement but may be added to improve the sensing characteristics of the moving mechanical components in relation to the magnetometer sensor.

Gyros or gyroscopic sensors measure an instantaneous rare of rotation, typically in terms of degrees per second. Accelerometers measure an instantaneous acceleration, typically in terms of meters per second squared. It is common for these sensors to be packaged on the same sensor integrated circuit "chip". They may be used in conjunction or separately. In some cases, a magnetometer may also be packaged on the same physical chip component. The use of one of these sensors is not dependent on the others except where it is defined as such. In some cases, for example where the sensor is offset from a center of rotation the reading from an accelerometer may be functionally equivalent to that of a gyro. The readings from these sensors may be converted to other rates. For example, an acceleration may be converted to a velocity over time and again to a position over time. Likewise, the signal from a gyro may be converted to a displacement in the rotational frame over time.

The "sensing device" refers to the combined system to determine the rotational state of the rods. This minimally includes a circuit board and a magnetometer. It may alternatively, or additionally, include inertial sensors such as an accelerometer, a gyro, a barometric pressure sensor, or may include a loadcell input. The sensing device is necessarily enclosed in a housing as it is to be deployed in an environmentally exposed location. Specifically, the housing of the actual sensor(s) is deployed at, or near, the point in which the rotation is to be sensed.

Of further note, the proposed sensors of a magnetometer, or a gyro, or an accelerometer, all may take the form of a solid-state device. In some cases, these devices may be a MEMS type device with internal components. On either case, these sensors are suitable for being fully encased in a medium such as epoxy. Further they may be contained in housings constructed from a wide array of materials.

The polished rod is held by a heavy-duty clamp referred to as a "polished rod clamp". One or more clamps may be used. This is different from the clamping mechanism which would be used to attach the sensing device. At least one polished rod clamp is used and is held to the rotator through gravity and friction. Additional polished rod clamps may be placed above the primary clamp to provide additional holding capacity for the weight of the rod string extending downhole. Additionally, one or more polished rod clamp may be placed below the bridle assembly as a backup in case the main polished rod clamp fails, or the polished rod breaks. The primary purpose of this lower clamp is to catch the falling rod in case of a break. The lower polished rod clamp prevents the falling rods from falling through the stuffing-box at the top of the wellhead.

The term "polished rod clamp" is used to refer to the heavy-duty clamp placed directly on the polished rod. In some respects, the sensing device may be clamped directly to, or around, the polished rod clamp. The clamping of the sensing device to a member should be understood to be different from the clamping of the polished rod clamp to the polished rod.

The stuffing-box is a sealing mechanism placed at the top of the wellhead. It contains a sliding seal in which the polished rod moves linearly through its stroke. A sensing device may be attached to the stuffing-box or wellhead either directly or through some standoff mechanism. The stuffing-box or wellhead may be referred to interchangeably in this disclosure. The stuffing-box and wellhead are stationary components, and the polished rod moves within these components, both linearly with stroking action and rotationally.

Several possible attachment devices are used. A Zip-Tie is a plastic (or nylon) device used for strapping around an object. Teeth engage ridges along the strap to ensure the device is tightened in one direction. In addition to a zip-tie, a worm gear band clamp may be used. This generally requires a screwdriver to install, whereas the zip-tie only requires the installer to pull the free end of the strap. A band clamp bay also be a cantilever style clamp where a cam-like actuator draws the clamp loop smaller. Safety wire may be used as the twisting action of the wire also draws the loop smaller. Other strapping mechanisms may be used such as rubber or Velcro. An adhesive based strap may also be used. It should be understood that a strapping mechanism may include one or more of these methods and they may be used interchangeably for the purpose of this disclosure.

DESCRIPTION OF SELECTED SPECIFIC EMBODIMENTS

The first embodiment is a housing arranged in a 90-degree opposing cavity such that a battery is placed in one side, and the circuit board (with sensors and radio transceiver) is placed on the opposing side. The angle of this enclosure is not limited to 90 degrees and may be larger or smaller. In yet another aspect, the angle may be incorporated into the housing, or may be an external component for which to receive the attached member. The battery and circuit board may also be placed on the same side (or in the same plane). The enclosure may be rectangular, tubular, or irregularly shaped. In other embodiments, there may be an external cable instead of a battery. In some respects, the stationary configuration placed on the wellhead may be further adapted to detect rotation of a tubing string contained within the wellbore.

FIG. 1 represents a typical pumping unit. The polished rod, 101, reciprocates in the linear direction (up and down). The bridle cables, 102, are attached to the pumping unit via the horsehead, 103. The bridle assembly, 120, contains several components to operationally attach the bridle cables to the polished rod. A rod rotator mechanism and a loadcell are typically incorporated into the bridle assembly. The rotator mechanism is actuated by a steel braided cable, 121, attached to a stationary location on the pumping system. The length of this rotator cable is configured such that it will pull a ratchet mechanism on each stroke.

The sensing device may reside in the region of the bridle assembly (120), but it may alternatively be placed stationary on the wellhead, 130. The exact location of the wellhead sensor depends on the configuration of the wellhead itself. Typically, a stuffing-box is placed at the top of the wellhead and provides a linear sliding seal for the polished rod. The sensing device, 141, may be attached directly to the wellhead (or stuffing-box), or may be indirectly attached through an intermediate mount, 140. This intermediate mount may better position the sensing device or may provide thermal isolation.

Some wells utilize a tubing rotator which is incorporated into the wellhead assembly. The tubing is rotated in a similar fashion to that of the rod-string wherein the stroking action of the pumping system is mechanically linked through a ratchet mechanism and worm gear to slowly generate a slow rotation. The tubing string is fully contained in the wellbore and so it is impossible to visually observe proper rotation. The magnetic field however can permeate the surrounding assembly and provide a sense-able field for a magnetometer placed at location 141, near the rotating tubing assembly. In this scenario, the tubing may have an inherent magnetic field, or a distinct magnet may be incorporated into the rotating component. The sensor at or near 141 would observe multiple simultaneous signals; the short-term stroking action of the approaching bridle assembly, the longer term rotation of the polished rod, and the longer term rotation of the tubing.

With rod rotation alone it is sufficient to observe if there is rotation occurring. When both a tubing and a rod rotator are used, it is important to identify and attribute rotation to each component individually. This may require knowledge of the rotational rate. While this is not strictly required, it is helpful to identify if one or both rotations have stopped. It would further be beneficial to ensure the rotational rates of the tubing and the rotational rate of the rods is functionally different. This is unlikely to occur naturally, but if the 2 rotate at exactly the same rate, it would be difficult to separate the signals. From an alerting purpose it is sufficient to identify that at least one of the rotations has functionally stopped. From that knowledge a technician would be deployed to further troubleshoot the system. Only one failed rotation component would be required to alert an operator, and so knowledge of the expected rotational rates is not critical.

A well automation controller (pump-off controller, or POC) is typically associated with a well. An automation controller is not strictly required as the sensing device may convey the rotational status through a warning light. The component indicated by 150 is meant to represent a POC with a co-located I/O module associated with the rotation sensor. Component 150 may also represent a stand-alone I/O module or a light indicating rotational status. The connection between this I/O module and the sensing device may be through a cable, illustrated as 142 for a stationary wellhead mounted sensor, or cable 152 for a bridle mounted sensor. A loadcell cable is typically a 4-conductor shielded cable and is typically routed along the path of 152. A dedicated cable may be used for the sensing device and would follow the same general path. Or the existing loadcell cable may be repurposed to carry digital signals of load and rotational status, among other signals.

In the case of a wireless sensor, the antenna at the stationary I/O module is illustrated by 151. The stationary rotation sensor 141, or a sensor residing in the region of the bridle assembly, 120, do not require a cable and so 142 and 152 may be omitted. 152 is intended to be illustrated as a repurposed loadcell cable that now carries power for the sensing device and digital data, rather than the original analog voltage and resistance across a bridge for the loadcell signal. In effect, repurposing this cable for digital communication allows for a multitude of sensor data where the original analog signal only could carry load signal.

Figure 2:
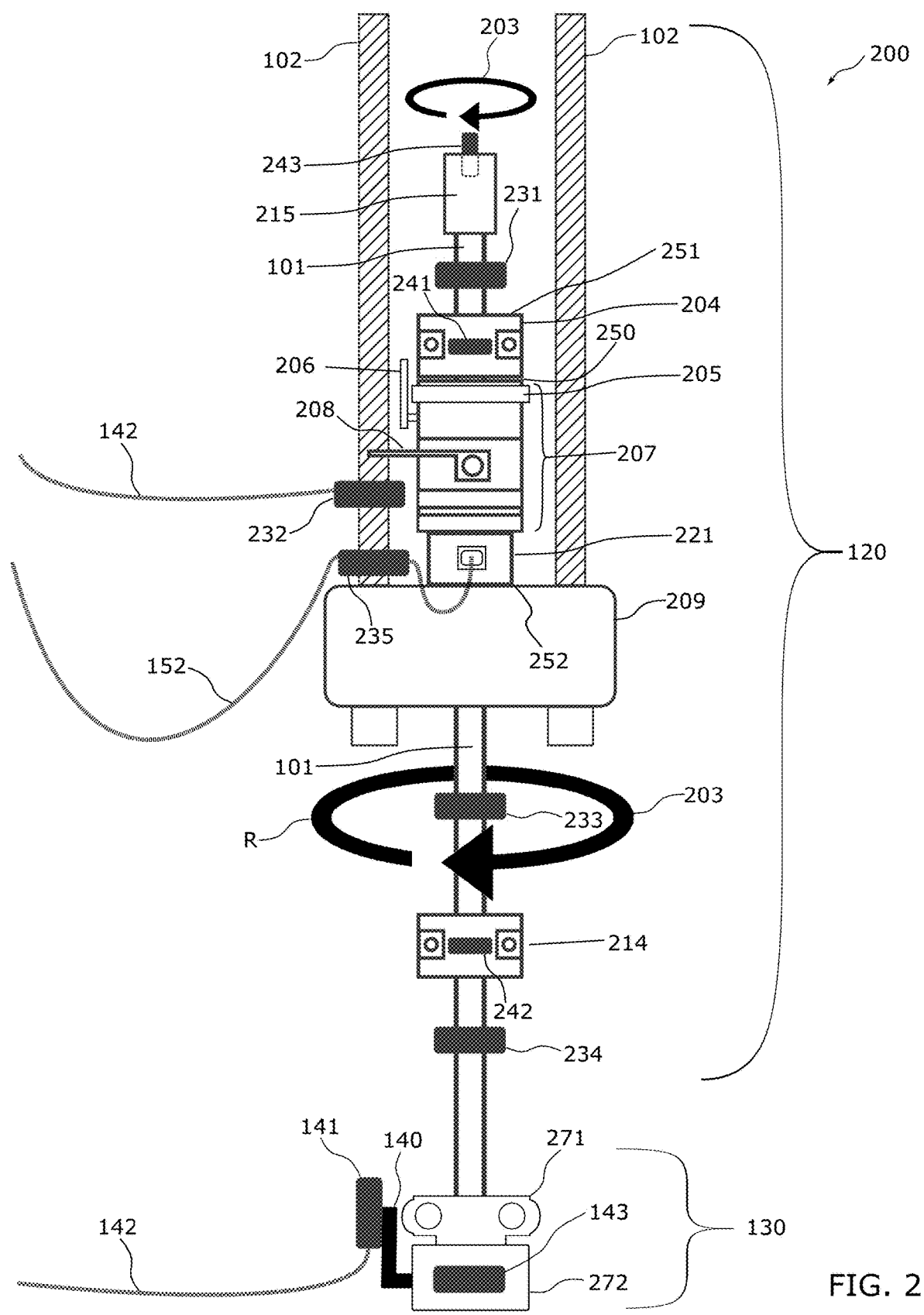
FIG. 2 illustrates the bridle assembly and various components. There are several possible locations where the sensing device may be placed and are illustrated.

FIG. 2 represents the bridle assembly and several possible sensing locations and configurations. The polished rod, 101 extends through the center of the bridle assemble and is expected to be rotating in the direction of "R" or arrow 203. The bridle cables 102 suspend the bridle in a rotationally constrained manner. The bridle cables are also positively attached to the horsehead above (sec 103, FIG. 1) and to the bridle bar 209 below, which carries the load of the rod string.

An optional loadcell, 221, may be placed on the bridle bar at interface 252, and below the rotator assembly, 207. This is the typical placement of the loadcell because it is a rotationally stationary position. Loadcells are typically wired, (see cable 152 in FIG. 1) and so they are required to be rotationally stationary. In some configurations the loadcell may alternatively be placed above the rotator at the interface indicated by 250. In this upper configuration, the loadcell must be wireless as it would undergo rotation. This wireless loadcell undergoing rotation provides an opportunity to sense rotation via receive signal strength, as disclosed in U.S. Ser. No. 16/228,233.

The main load-bearing polished rod clamp is indicated by 204. The rotator mechanism 207 either directly rests on the carrier bar at the interface 252, or on the loadcell, 221. This is a gravity interface and transfers the rotational force from the bridle bar, through the rotator mechanism, to the rod-string. The upper frictional contact is illustrated by 250 and is the point where the upper polished rod clamp, 204, rests on the rotator table, 205 (or, alternatively on top of a wireless loadcell). An anti-rotation bar, 208, may be used to ensure the rotational action of the rotator mechanism is transferred to the polished rod. The ratchet arm used to actuate the rotator mechanism is illustrated by 206 and is attached to the cable 121 (FIG. 1).

The sensing device may be placed at several locations. These include the exposed section on the upper polished rod, at the position indicated by 231. Or it may be placed a lower section of the polished rod below the bridle. The sensing device in this lower region may be placed above the lower polished rod clamp (214) but below the bridle (209) as indicated by 233. Or it may be placed below the lower polished rod clamp (214) but above the wellhead (130) as indicated by the sensing device located at 234.

The sensing device may also be placed on or around a polished rod clamp. This is illustrated on the lower polished rod clamp, 214, by the sensing device indicated by 242. A sensing device, 241, is also illustrated on the upper polished rod clamp, 204. When the sensing device is placed at 231, on the exposed polished rod, it may be placed such that it rests on the top surface of the upper polished rod clamp, 204, at the surface indicated by 251. This, much like the rest of the bridle assembly, would be a gravity interface. The purpose of resting the sensing device on a horizontal surface is to ensure stability beyond what is provided by the attachment mechanism alone. Alternatively, the sensing device 241, placed on or around the upper clamp, 204, may be placed such that it rests on the rotator table, 205, and where the sensing device housing would contact the rotator table (205) at the interface illustrated by 250.

Alternative placements of the sensing device are illustrated by 232 or 235 where it is attached to a bridle cable, 102, or some other fixed position on the bridle assembly. This is a rotationally bound position and so the sensing device would only see partial rotations or oscillations due to torque-induced deflection, or the rotating magnetic field generated by the polished rod. The sensing device 235 is intended to illustrate an in-line device utilizing the existing loadcell cable but repurposed to carry a digital signal. The sensing devices 232 and 235 are illustrated as wired devices, but could be wireless, or a combination of wired for power and wireless for data.

If the magnetic field of the polished rod is insufficient, an optional magnet may be placed on the polished rod. A magnet in this configuration may be placed anywhere along the rotating assembly. In particular, the locations 231, 233, 234, 235, 241, 242, or 243 would be suitable. These locations are intended to represent possible sensing locations of the sensing device itself, but in this context may be a location of a distinct magnet. Alternatively, a magnet may be placed on the bridle at 232, 235, or on the wellhead at 141, 143 (see FIG. 1) to achieve the same results of a distinct and relative magnetic field to sense rotation. Alternatively, a component such as the polished rod clamp, polished rod clamp bolt, or polished rod clamp nut, bridle, etc. may themselves be magnetized during their construction. Likewise, a component in a tubing rotator located within 130 may be magnetized or may contain a magnet.

A sensing device may also be placed at the very top of the polished rod at 243. The housing for placement at this position would be slightly different as the upper polished rod coupling. 215, has internal threads. In this configuration, the housing would be constructed such that it would thread into this coupling, with an optionally exposed upper section. The diameter of the housing at 243 should be smaller than the coupling to ensure it is not impacted by the horsehead, 103. The height at this location is not a concern beyond practical construction of the housing.

Rotational sensing may be accomplished with a gyro or accelerometer placed at any of the illustrated sensor locations. A gyro-based, or an accelerometer-based, sensor would specifically be applicable at locations 231, 232, 233, 234, 235, 241, 242, and 243. A magnetometer is not a strict requirement for rotation sensing but is the most beneficial sensor in terms of positively identifying rotation through a relative magnetic field. The magnetometer can determine both linear motion and rotational motion. The same may be sensed by an accelerometer or by a gyro. The sensing components may be integrated into the loadcell, 221, either directly, or through an intermediate housing attached to the loadcell.

The wellhead is illustrated by 130 and is below the bridle assembly. The wellhead is stationary, while the bridle assembly, 120, reciprocates up and down. This illustration shows the bridle assembly near the bottom of stroke. This illustrates how a sensor placed at 234 may be crushed between 271, the top surface of the stuffing-box, and 214, the lower polished rod clamp. This would occur if 214 comes very close to 271 during the stroke.

The sensing device (or magnet) may be placed stationary on, or around, the wellhead, 272. The wellhead generally means any component in the region of 130. The sensing device (or magnet), 141, may be offset from the wellhead using a mounting component, illustrated by 140. Or the sensing device (or magnet), 143, may be placed directly on the wellhead or stuffing-box.

The sensing device illustrated at each of the locations may be either wired or wireless. In some respects, the sensing device may be integrated into another component such as a loadcell or be placed in line with an existing electrical cable connecting said loadcell to an automation controller, 150. There are 2 functionally suitable places for a wired sensor, on the wellhead at either 141 or 272, or on the bridle at 232 or integrated into the loadcell at 221. The cable 142 illustrates a dedicated sensor cable and may be placed stationary from the wellhead, or partially suspended similar to that of the loadcell cable, 152. The loadcell cable in this configuration is intended to illustrate a dual-purpose cable wherein the analog load signal is replaced with a digital signal carrying multiple sensor readings, including load measurements. The cable 152 may be a distinct cable run in addition to the existing loadcell cable.

In cases where an optional distinct magnet is used, the magnet may be placed at any of the indicated sensor locations 141, 231, 232, 233, 234, 235, 241, 242, 243, and 272. The magnet (or sensing device) may also be placed in a region near these indicated positions as the locations in the drawing are approximate. In the cases where a magnet is used, a corresponding sensing device would be placed at another of the indicated positions. In general, the optional magnet should be placed on a member that is moving with respect to the sensor. For example, a magnet at 141, and a sensing device at 232 (or vice versa) would only sense linear stroking position since neither of these are rotating (assuming the polished rod is rotating, but has an insufficient magnetic field which is not sensed by the magnetometer).

A magnet placed at 242, and a sensing device at 141 would detect both linear stroking position and rotational movement. Interestingly, in this configuration, the rotational movement is detected during only part of the stroke as the magnet may moving in and out of sensing range. Alternatively, a sensing device at 232 and a magnet at 242 would detect rotation during the entirety of the stroke. This configuration may also measure rotational torque buildup and release as disclosed in U.S. Ser. No. 16/228,233. This is particularly interesting because the sensing device at 232 (or integrated into 221) sees rotation in the magnetic field from the polished rod and optionally attached magnet. It also sees linear motion from the approaching wellhead (and optionally placed magnet at 141). And the sensing device at 232 further sees its own rotational deflection by observing the natural magnetic field of the earth. This is interesting because the sensing device at 232 (or integrated into 221) is not undergoing rotation itself, rather, it is observing a multitude of magnetic fields and processing that signal to identify each individual component of that signal.

A sensing device at 272 (or 141) may also observe the rotation of tubing contained within the wellhead. This is because the magnetic field may permeate, or rather become distorted and conducted by, the surrounding wellhead. The wellhead is a large steel component that completely encapsulates the majority of the tubing rotator mechanism. In the case of Hurst, the wellhead must be pierced such that a magnetic pickup can be placed close enough to the corresponding magnet to trigger. By using a continuous multi-axis magnetometer, the sensing device may be placed entirely outside of the wellhead, and in the case of 141 may not even need to contact the wellhead. This is because the wellhead itself is conducting the magnetic field from the internal tubing rotation. If the tubing itself has an accumulated magnetic field, the magnetometer would observe the rotating field. A magnet may optionally be placed in the tubing rotation assembly to improve the field detectability, but this is not required. The close alignment required by Hurst is also eliminated because the magnetometer can sense the field at some distance given that the metal components distort and conduct this field.

Figure 3A:
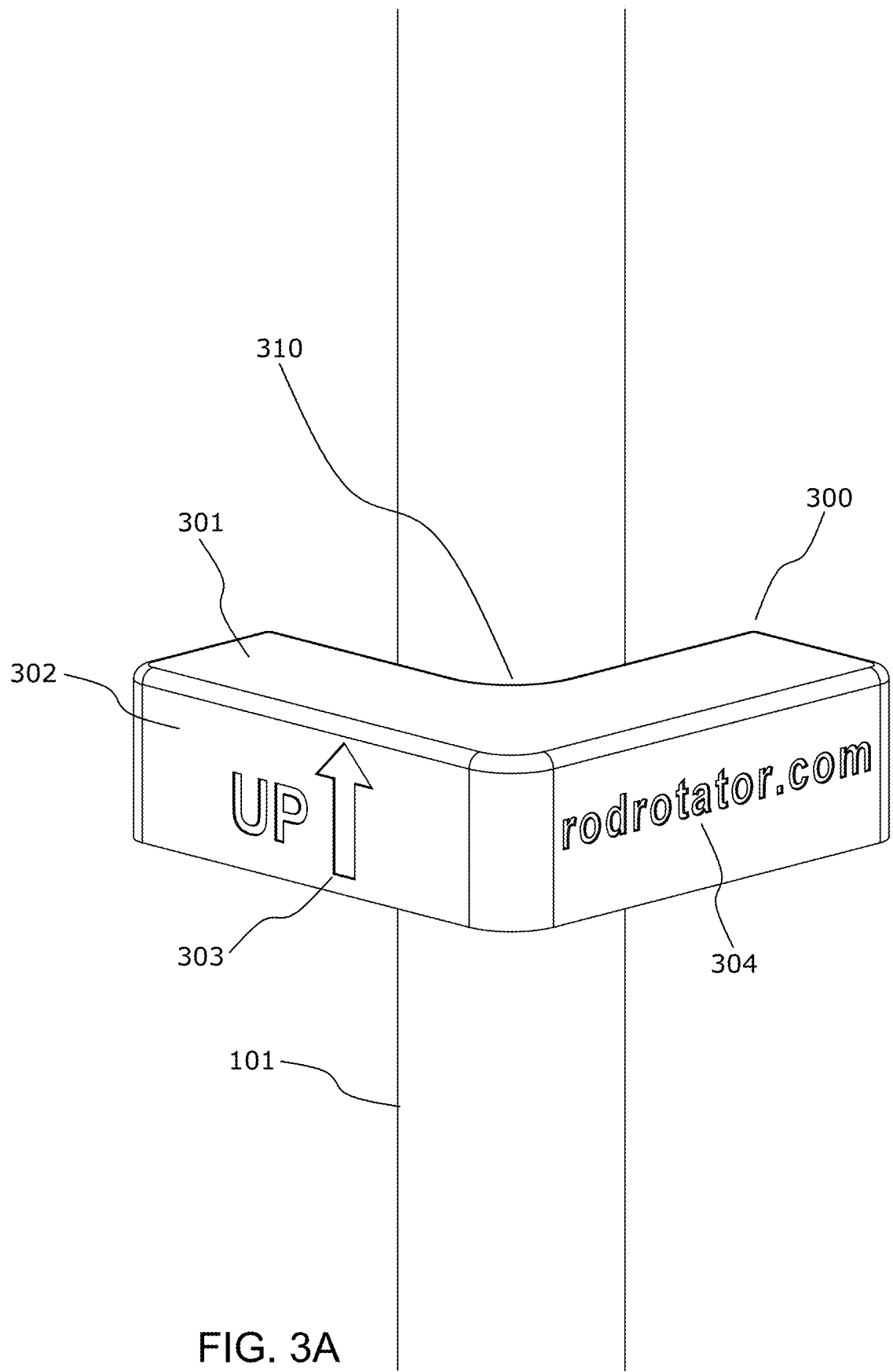
FIG. 3A illustrates the one embodiment of a unitized wireless sensor, attached to a polished rod. While this first embodiment is illustrated, there are several alternatives that may be used. These include a wired sensor and alternatively shaped, or constructed, housings.

FIG. 3A represents the first embodiment of a unitized sensing device attached to a polished rod. The illustrated sensing device is located on the polished rod and is positioned at 231, 233, or 234. The sensing device is constructed such that the upper surface, 301, and the side surfaces, 302, are continuous over the "top" sections of the sensing device. This ensures the internal components will be naturally protected from environmental liquids such as rain, or from crude oil that may be sprayed on the sensing device due to a stuffing-box seal failure. The enclosure is angled such that the polished rod, or attached member is drawn into the inner angle, 310.

By attaching the enclosure on the inner surface, the outer exposed surface may contain instructional or identifying features. An "UP" arrow, 303, may be embossed on the side of the enclosure to ensure proper placement. Text, 304, may also assist in identifying the sensing device to field service personnel. This label may include certifications, serial number, version number, a QR code, or any useful information. The label may be affixed to the enclosure or may be embossed in the construction or molding of the housing. Embossing may be accomplished as part of a thermoplastic injection mold or a rubber compression mold. The text may be part of the mold itself and be transferred to the housing as part of the molding process.

Figure 3B:
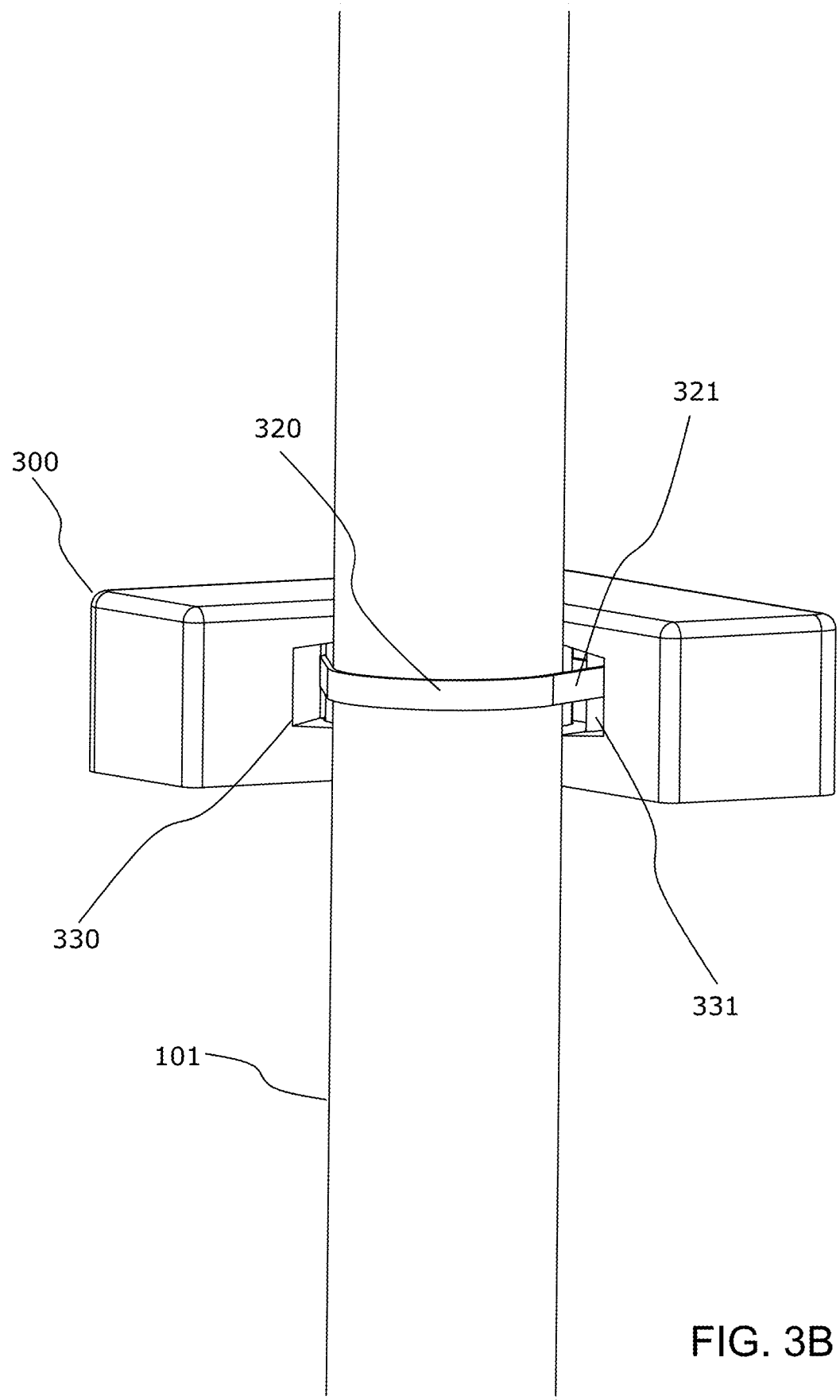
FIG. 3B illustrates the back side of the attachment where a zip-tie is used, through an undercut.

FIG. 3B represents the attachment of the sensing device. In this case a zip-tie, 320, or metallic band clamp is used and extends around the attached member (the polished rod, 101, in this case). An undercut, 330, in the housing provides a path for the zip-tie. Guide pins, 331, direct the zip-tie away from the polished rod such that the force of cinching the zip-tie pulls the housing and polished rod into one another. In this configuration, a small section of zip-tie is exposed, 321. This allows the zip-tie to be cut by standard wire cutters, making removal an easy process. This section of exposed zip-tie is still relatively protected as it is between the polished rod and enclosure body.

Figure 3C:
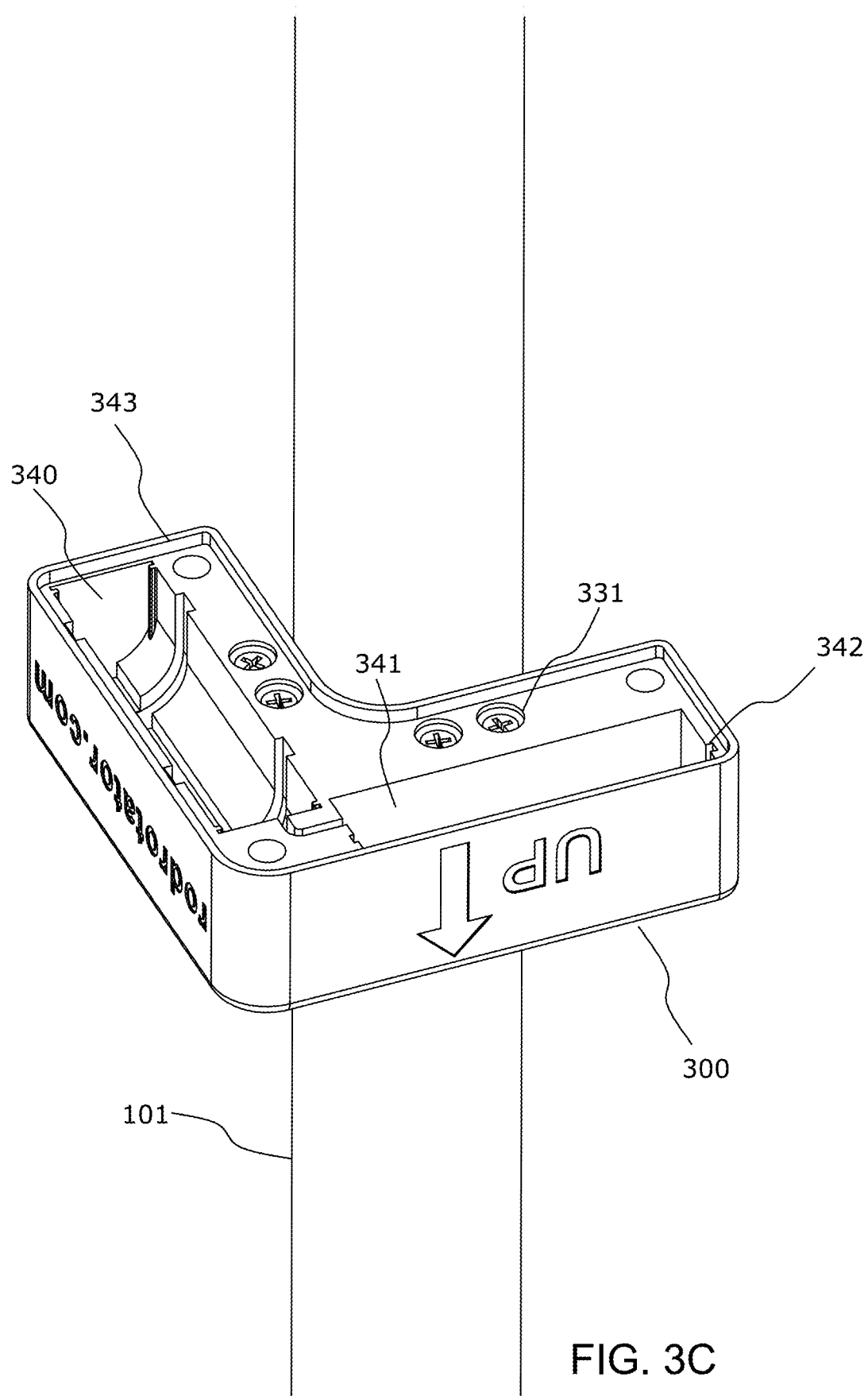
FIG. 3C illustrates the underside of the enclosure with molded features to contain the internal electronics such as the battery and PCB. The guide pins and recess for a cover are also shown. In this configuration the transmitter uses an integrated antenna embedded on the PCB.

FIG. 3C represents the under-side of the first embodiment and shows the internal features of the housing. The guide pins (331) are shown as screws. These guide pins may take other forms and may not even be a "pin" in the traditional sense. The guide may be a molded slot or passage. A cavity, 341, for the sensor circuit board (not shown) is provided. Further, slots 342, are provided for easy assembly of the circuit board into this enclosure. The circuit board may be placed into the slots and the cavity filled with epoxy or other material. A battery cavity, 340, is similarly provided and is illustrated 90 degrees from the plane of the circuit board. The angle or placement of these components may differ from this specific embodiment. The cavities 340 and 341 may be filled with epoxy. These cavities may be combined or separate as illustrated.

A recess, 343, is provided for an under-side cover. The recess shown by 343 can receive a lid while ensuring any fluids drawn down by gravity are safely directed away from the inner region of the sensing device. FIG. 3C is shown upside down, and so the recess lip (343) would extend past the underside cover. If the inner cavity is epoxy filled, the lid may be unnecessary as all critical components would be sealed from the environment.

Figure 3D:
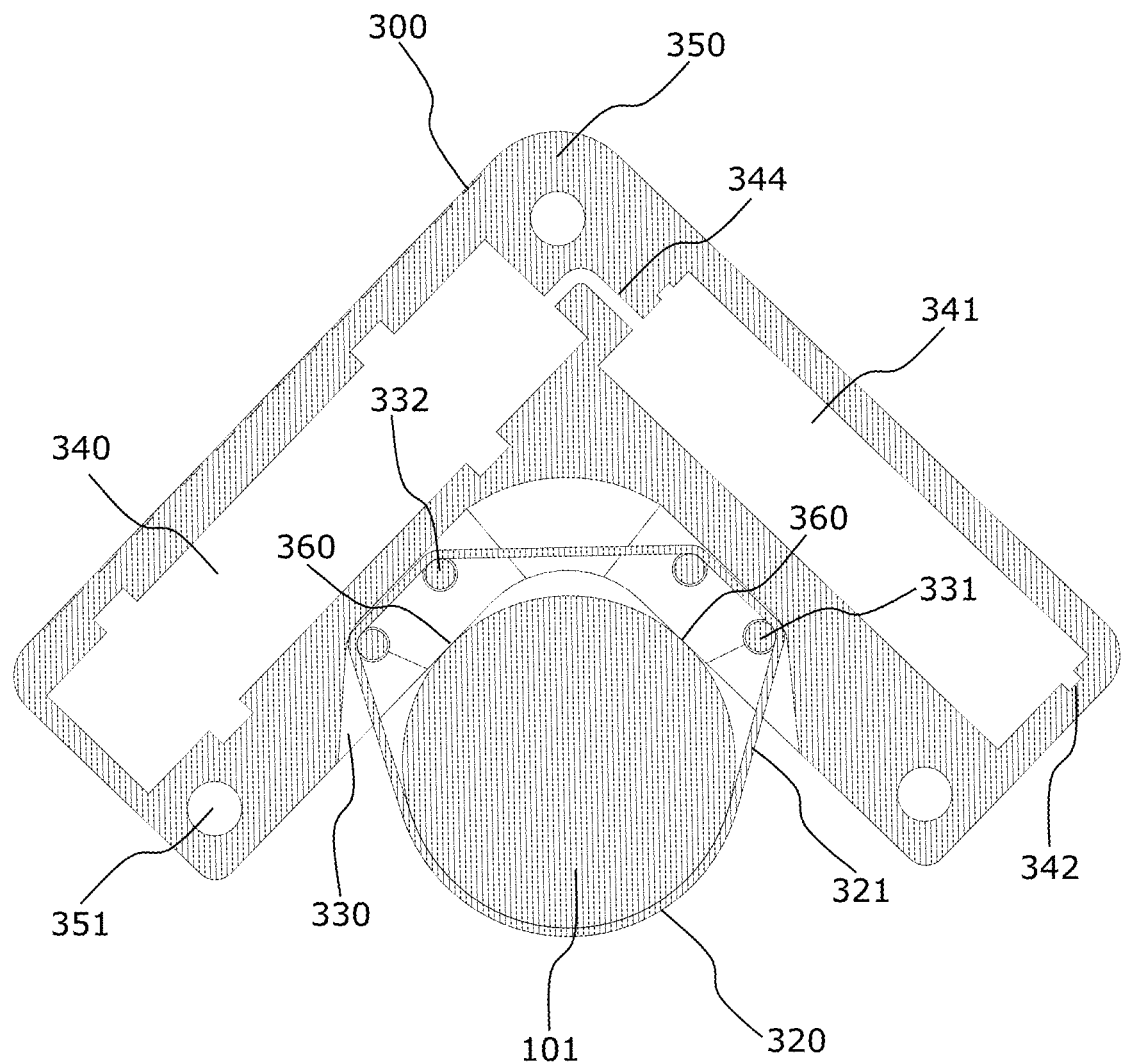
FIG. 3D illustrates a cross-sectional view of the embodiment and shows the undercut attachment mechanism and path of the zip-tie.

FIG. 3D represents a cross sectional view of this embodiment. The sensing device should not be limited to this specific configuration of perpendicularly placed circuit board and battery. As discussed above, a wired sensing device may not even contain a battery, and so this illustration is one of several possible configurations for a rotation sensor housing.

The cross-sectional view is shown by 350 and is approximately sliced at the vertical center of the housing to capture the path of the zip-tie, 320, through the undercut, 330. The zip-tie (band clamp, or other strap) is directed around guide pins 331 and 332. The number and placement of these pins is dependent on the member to be attached. In some cases, a single inner pin may be sufficient. In other configurations this retaining feature to hold the zip-tie away from the polished rod may take the form of a passage or slot instead of a distinct pin. Of note, the zip-tie, 321, and retaining features, 331 and 332, draw the polished rod against the housing at contact points 360. This creates 3 points of contact and a stable attachment. The passage 344 provides a path for the wires from the battery in cavity 340 to the circuit board in cavity 341. The internal region of the sensing device may be substantially empty and so a need for distinct cavities and a connection path may be unnecessary.

Figure 4:
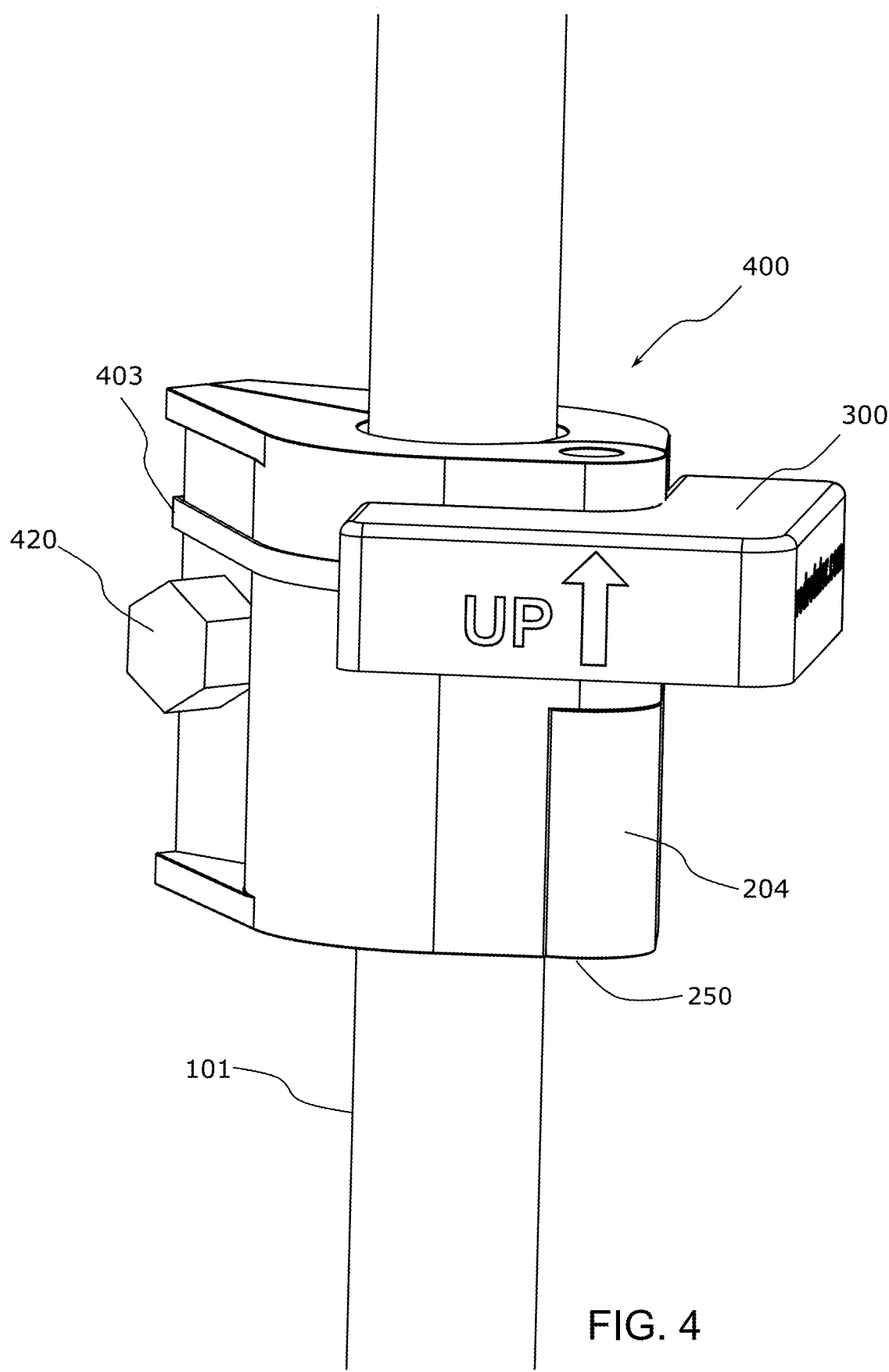
FIG. 4 illustrates that the housing from FIG. 3 may also be attached to an oddly shaped polished rod clamp. The rod rotator table is not shown, but the bottom face of the clamp would rest on the rotator. Note the height of the sensing device is substantially shorter than the height of the polished rod clamp to which the sensing device is attached.

FIG. 4 represents the first embodiment placed around a polished rod clamp 204. This illustrates that the shape of the sensing device housing, 300, is suitable for attachment to a round rod, or an irregular shaped polished rod clamp. The clamp is illustrated as the main upper polished rod clamp, 204, but could equally represent the lower polished rod clamp, 214, or any secondary polished rod clamp. The upper polished rod clamp rests on the rotator table (FIG. 2, 205) at the interface shown by surface 250. The rotator table is not illustrated in this figure, but FIG. 2 shows this "stacked" interface. The zip-tie (or band clamp, safety wire, etc.) is illustrated as 403 and encompasses the outer surface of the polished rod clamp. The main bolt for tightening the polished rod clamp is shown as 420. This may provide an alternate attachment point for the sensing device. Some polished rod clamps have more than one bolt. A longer bolt may provide a threaded region to which an alternate housing may be attached by threading onto this excess bolt thread.

Figure 5A:
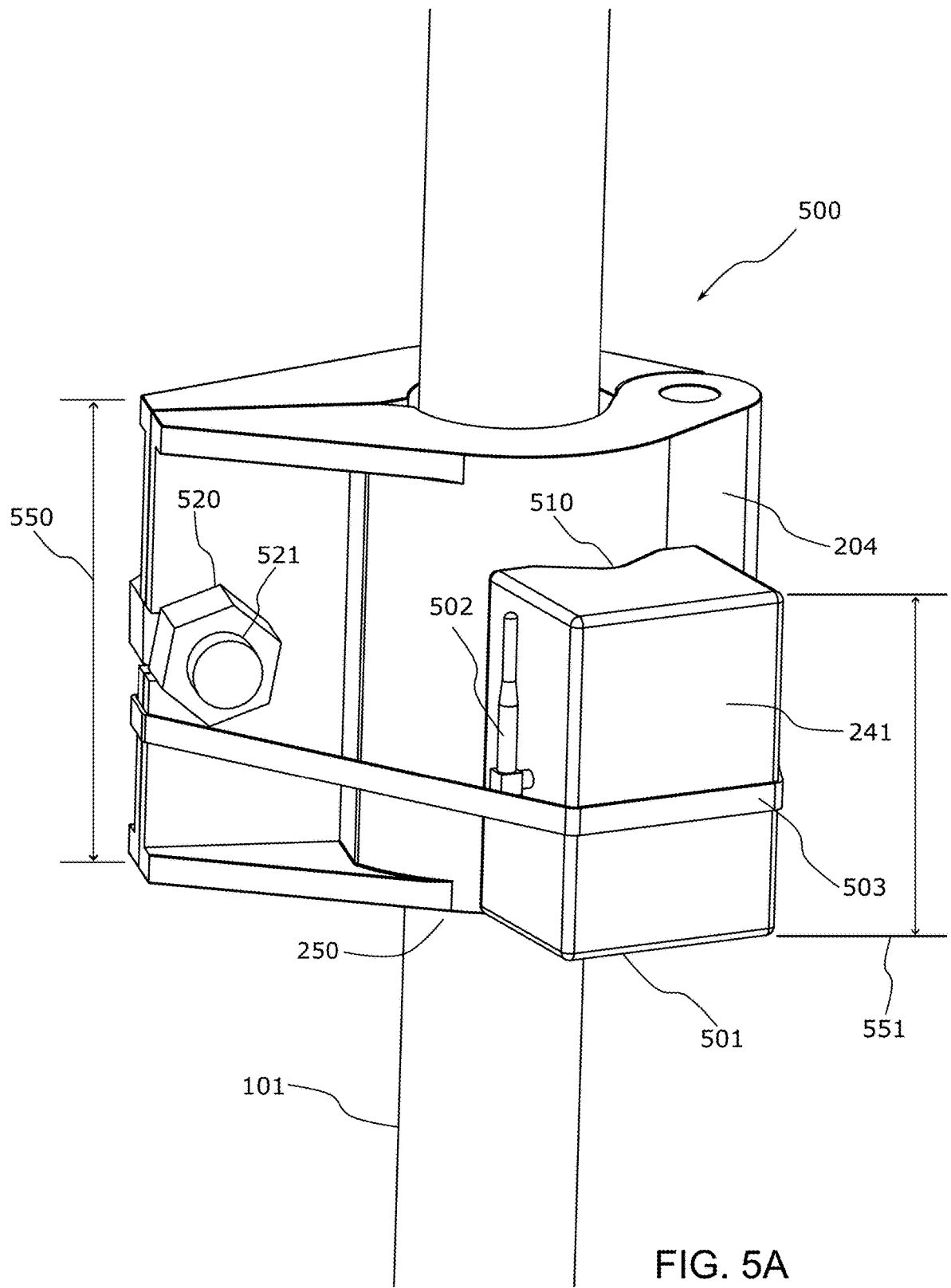
FIG. 5A illustrates an alternative housing configuration that is more rectangular. In this illustration there is a distinct external antenna, but this is not a requirement. The antenna may be internal, or a hard-wired cable may be used. The sensing device may be attached to some other member such as a stuffing-box or wellhead. Of note in this illustration is the relative heights of the polished rod clamp and the height of the sensing device. It is desirable to ensure the total height of the sensing device is shorter than the attached polished rod clamp, such that the sensing device will not be impacted by external components during pumping operations or catastrophic failures.

FIG. 5A represents an alternate embodiment utilizing a different housing shape. In this configuration, the zip-tie, 503, encompasses the outer surface of both the polished rod clamp and the sensing device. This configuration does not utilize an undercut. An angled face or "cradle", 510, is provided to stabilize the sensing device. This provides 2 distinct points of contact where the zip-tie provides the third and opposing contact force. In this figure, an external antenna, 502, is illustrated. This could be an internal antenna, or an antenna could be completely omitted if a hard-wire connection is used.

Of particular note in this figure is the overall height, 550, of the polished rod clamp relative to the overall height, 551, of the sensing device. The sensing device is shorter than the polished rod clamp meaning that any impacts in the vertical direction will be borne by the polished rod clamp and not the sensing device housing. Polished rod clamps are available in a wide range of configurations. The height indicated by 550 can be assumed to be approximately 4 inches. Ideally the dimension 551 would be significantly less than 4 inches, but this is a reasonable value to use when sizing the height of the enclosure. 4 inches from the rotational center of the polished rod is also a reasonable value to size the horizontal footprint of the housing such that it will be free of rotational restrictions when attached.

The polished rod clamp rests on the rod rotator table (see FIG. 2, 205) at interface 250. The sensing device may also rest on the rod rotator table, while being attached around the polished rod clamp, but should not extend above the top of the polished rod clamp. This is not a strict requirement for a functional sensing device but is preferable to ensure safe operation.

Figure 5B:
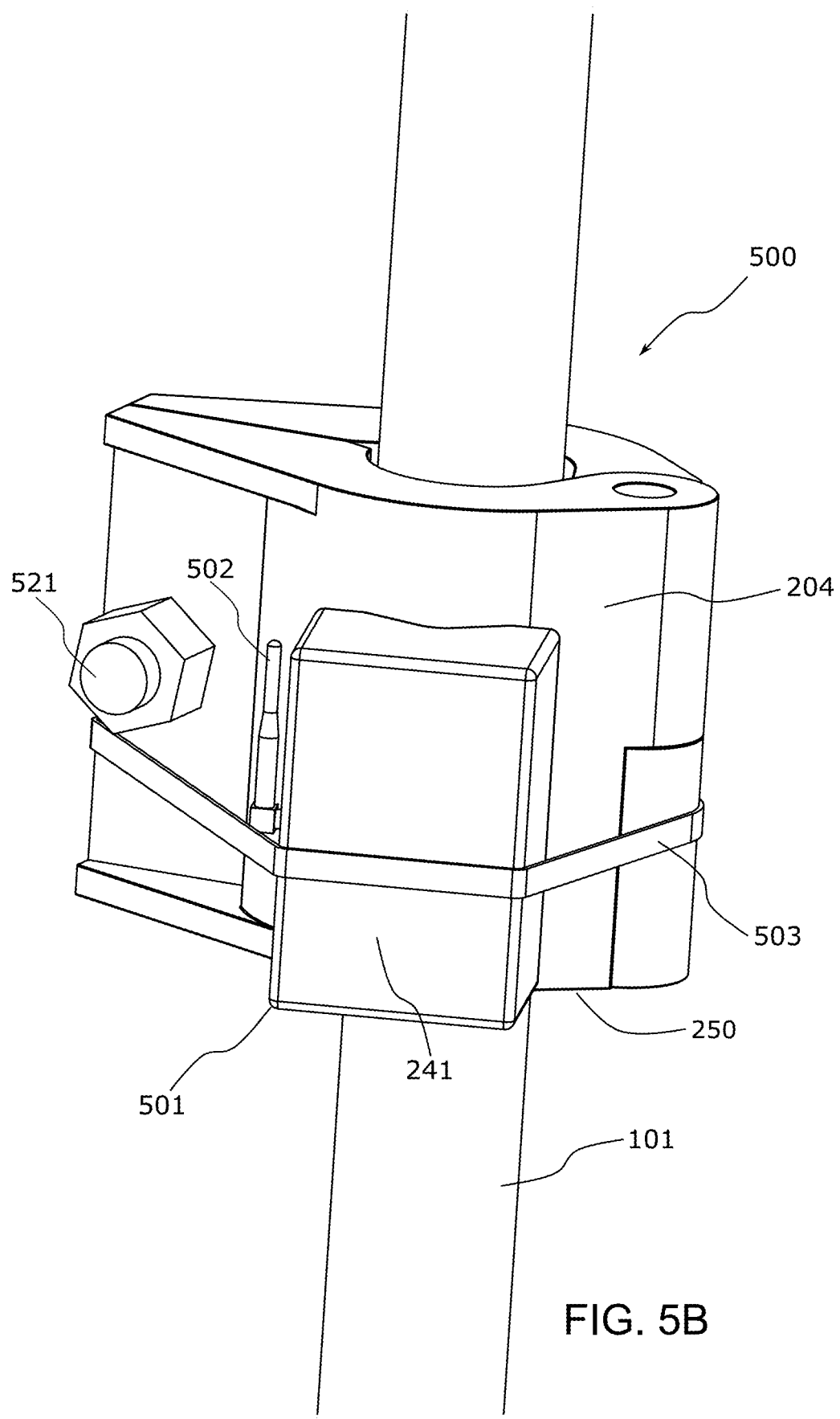
FIG. 5B illustrates another perspective view of the alternative enclosure shape from FIG. 5A.

FIG. 5B is an alternative perspective view of FIG. 5A. This shows the zip-tie from a different angle to illustrate its trajectory around the combined polished rod clamp and sensing device. The polished rod clamp bolt, 521, may extend past the nut, 520 and this may provide an additional attachment point. This is particularly interesting in the case of enclosing a magnet. For cases where the sensing device is placed in a rotationally stationary configuration (on the wellhead, on the bridle cable, or in the loadcell), a secondary component of a magnet may be used on the rotating assembly.

A magnet would naturally connect to a metal object through magnetic attraction, but it is desirable to encapsulate the magnet such that it would not be inadvertently dislodged, moved, or removed. The housing previously disclosed would be suitable for this purpose. Alternatively, a magnet may be placed in a nut that may be threaded to the free exposed section of polished rod clamp bolt, 521. This would act as a locknut, or an "acorn" nut. The benefit of this is that it would positively hold the magnet to a component which undergoes rotation. Such a magnet could also be enclosed by the polished rod clamp itself, or the polished rod clamp may itself be magnetized as part of its manufacturing process.

Figure 6:
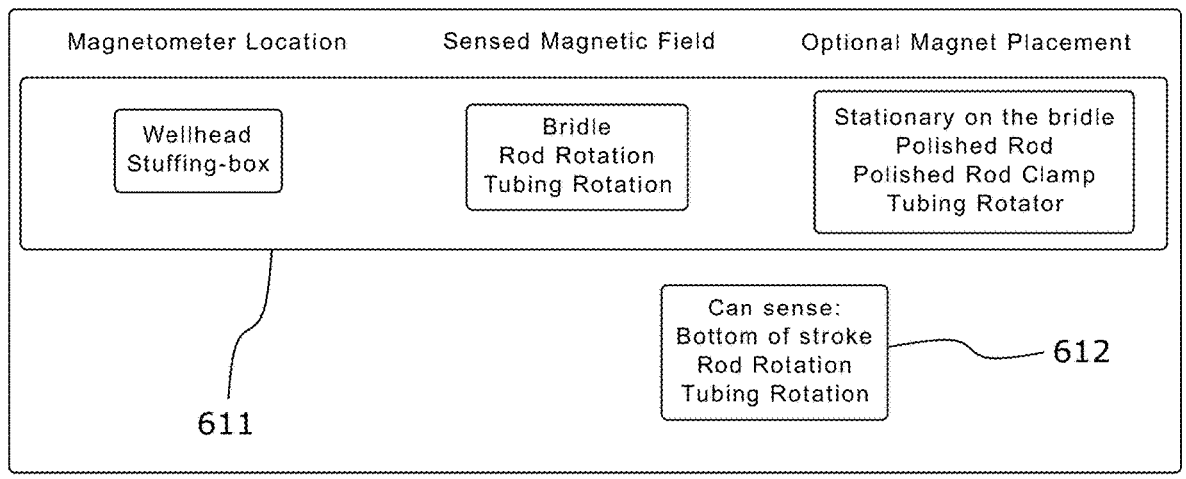
FIG. 6 is a chart of sensor locations and corresponding magnetic field to be sensed. The condition which may be resolved at the specified sensor location is also shown.
Figure 6:
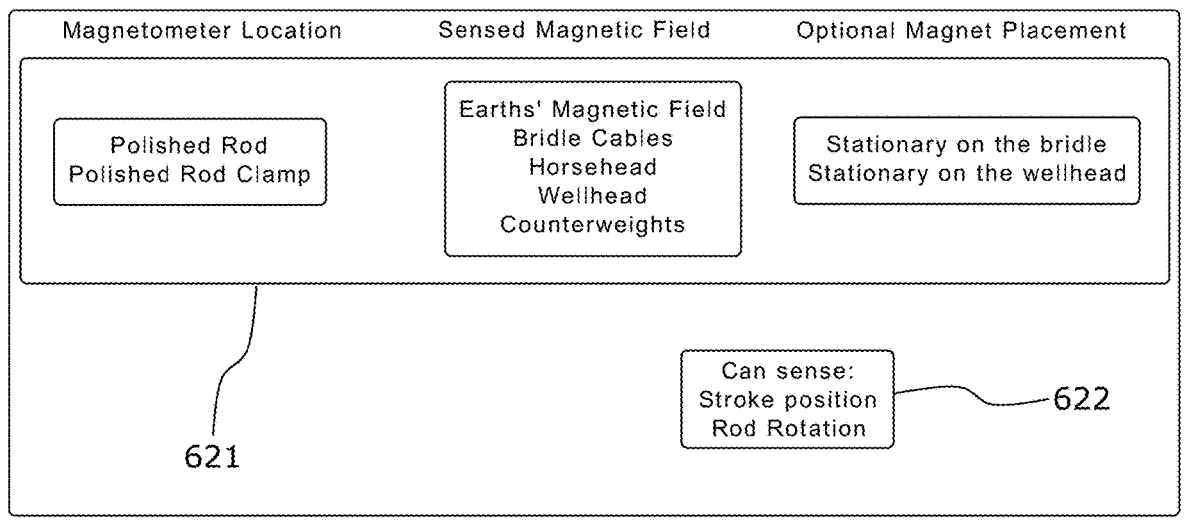
Figure 6:
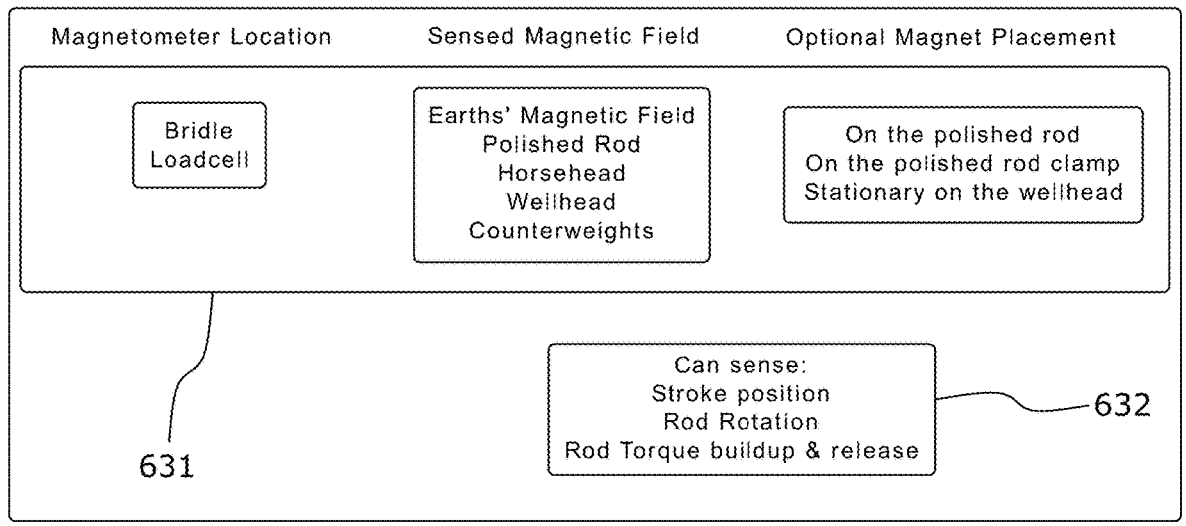

FIG. 6 is a chart of magnetometer locations and accompanying field to be sensed. Rotation and position sensing may be accomplished by other sensors such as an accelerometer, a gyro, or a barometric pressure sensor. These sensors only operate within their own frame of reference. A magnetometer can be influenced by an optionally placed magnet or multiple magnets and so it is useful to enumerate the combinations of sensor and sensed field with respect to the condition which may be determined from that combination.

Box 611 places the magnetometer on the stationary wellhead or stuffing-box. This is a fixed location in both the linear and rotational sense. Box 612 illustrates which conditions this configuration can sense. The magnetometer placed at this location may sense the approach of the bridle. This can typically be resolved without an additional magnet as the bridle is a significant steel component. Because the bridle moves far from the wellhead, the magnetic field of the bridle may become unsensible at a distance. A continuous stroke position may not be resolvable by the magnetometer alone, when placed stationary on the wellhead. When the bridle approaches the magnetometer, it can identify the closest point of this approach. This is referred to as the bottom of stroke, which is a useful measurement.

Rod rotation can be resolved from the field of the polished rod. An optionally placed magnet on the rotating polished rod, or polished rod clamp, can improve the sensing of this rotation. A magnet placed on the lower polished rod clamp, for example, comes close to the magnetometer placed on the wellhead on each stroke. As the magnet rotates along with the rods, the magnetometer can observe the orientation of the field change across many strokes.

Tubing rotation can be similarly observed by a magnetometer at or near the wellhead. In the case of the tubing rotator, the sensible component (such as a magnet incorporated into the mechanism, or the inherently magnetized tubing-string) maintains roughly the same proximity to the sensor during each pump stroke and through the rotation. The field orientation will however change with the rotation of the tubing. Unlike the rod rotation signal, which is dependent on stroke position, the tubing rotation signal is not split up by the changing proximity of the sensed component relative to the sensor. The tubing and rod rotation signals may be identified by this.

Box 621 shows the sensor placed on the rotationally and linearly moving polished rod. In this configuration, the sensor can identify the background magnetic field of the earth additionally the sensor may observe the wellhead and other components of the pumping unit. This may provide an approximation of stroke position continuously through the stroke. This configuration can resolve stroke position and rod rotation, as indicated by box 622.

Box 631 places the magnetometer on the rotationally stationary, but linearly moving bridle. This could be attached to the bridle cable, bridle bar, or rotationally stationary loadcell. This configuration, as indicated by 632, can resolve stroke position, similar to placing the sensor on the polished rod. When the magnetometer is stationary on the bridle, it may observe the rotating field of the polished rod or an attached magnet.

In addition to the stroke position and rotational status, placing the magnetometer on the bridle provides the additional measure of deflection of the bridle with respect to the earths' magnetic field. Observing this can identify torque buildup and release. In particular, when a downhole rotational resistance is overcome, the bridle should relax. The result is a significant change in orientation of the bridle (and attached sensor) when this release occurs. This condition may be identified from the other possible sensor locations, but it is most clear when the sensor is placed on the bridle. This is because its orientation relative to the earths' magnetic field only changes with respect to the deflection of the bridle, which is a result of the imparted torque present in the rod-string.

Figure 7:
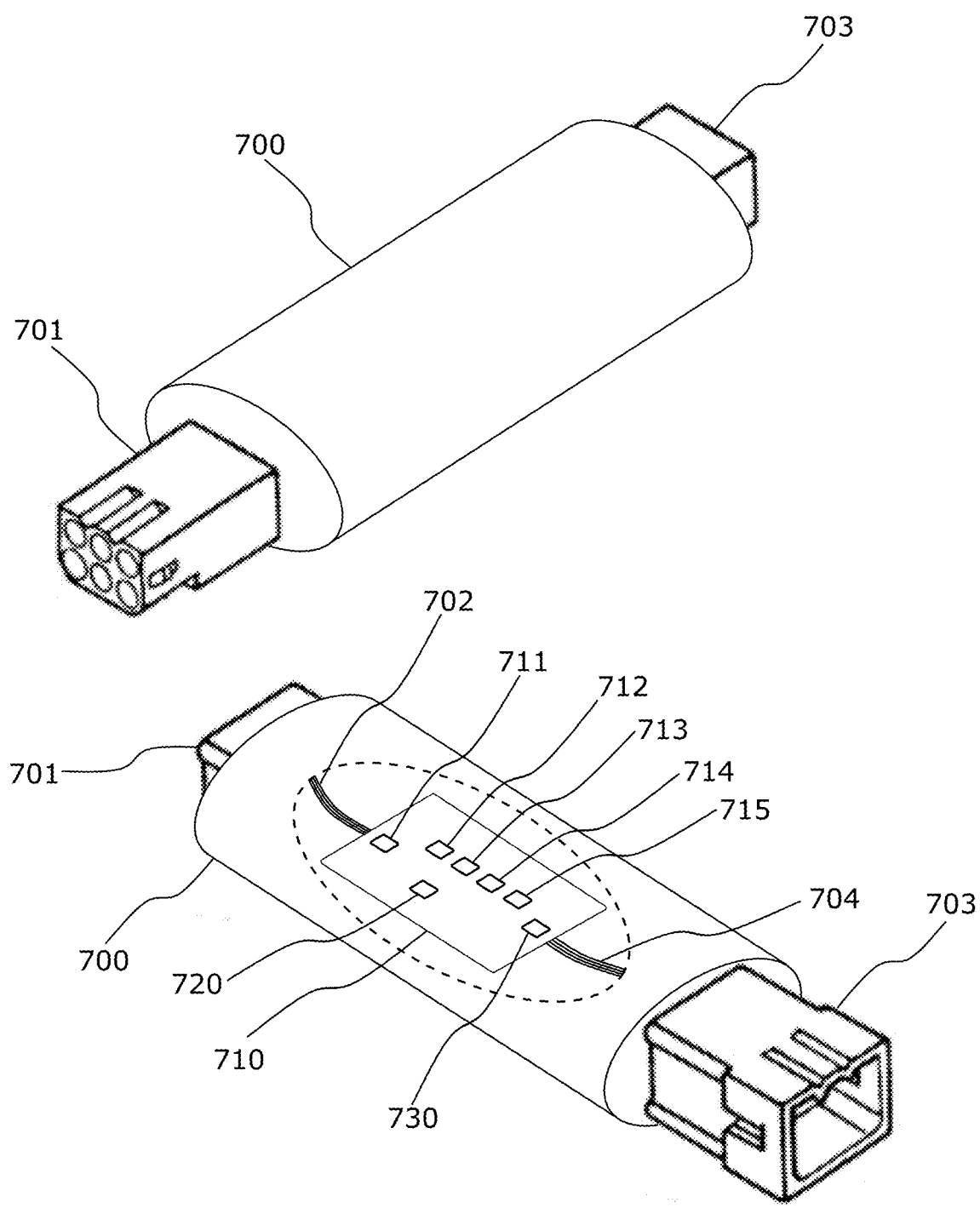
FIG. 7 illustrates a sensing device designed to be placed in-line with an existing loadcell cable. This provided complementary connectors. A dedicated sensing device would only require a connection on one end, or may incorporate the cable in a permanent manner, without a removeable connector.

FIG. 7 is a representation of a sensing device to be placed in line with the existing loadcell cable, or a dedicated standalone wired sensor. This is the sensor at location 235 in FIG. 2. The body, 700, of this sensing device enclosure may be a metallic pipe nipple, or other custom housing constructed by the processes discussed above (injection or compression molding, traditional machining, epoxy, etc.). This embodiment is meant to be placed in line and so connectors are provided. Connector 701 is identical to a standard connector used on a typical loadcell cable. This end may be attached directly to the loadcell and secured with a threaded outer attachment (not shown, but common in the attachment of the cable to the loadcell). Instead of an integrated distinct connector, a short pigtail may be provided from the enclosure with this connector for attaching to the loadcell. This would allow the sensing device to be positioned apart from the loadcell as logically indicated in FIG. 2. A complementary connector, 703, is provided to receive the end of the existing loadcell cable.

A cutaway is provided to show the contents of the sensing device. Internal to the sensing device housing is a circuit board, 710, that contains the sensing, processing, and communication components. In this embodiment there is a wired connection, so a radio is not necessary. A radio could still be provided in some cases.

Because this embodiment is intended to use an existing loadcell cable for power and digital data, the connector 703, is connected to the circuit board through internal wires indicated by 704. There are 4 wires, two for power (positive DC voltage and ground), and data (TX, RX). Power and data over cable 142 or 152 is provided by an I/O module located in 150 (FIG. 1). The I/O module is in turn connected to the automation controller to convert the digital signals to a form compatible with the well automation controller. This means rod load is converted from digital values, to an analog signal as if the loadcell was connected directly to the controller (as was the case before the loadcell cable was repurposed). This IO module may also provide an intrinsically safe barrier to ensure power delivered to the sensing device cannot create a spark in the hazardous environment.

The connector 701 is then routed to the loadcell. The internal wires, 702, bring the analog signal from the loadcell in to the sensor circuit board where it is converted to a digital value using an analog to digital converter, 711. Several sensor components are illustrated on the PCB, 710. These include a magnetometer, 712, a gyro, 713, an accelerometer, 714, a barometric pressure sensor, 715. A processor, 720, handles measurements from each of these sensors and communicates these values back to the I/O module via a transceiver, 730. This transceiver may be an RS-485 chip, or other suitable communications medium. Alternatively, the digitized data may be sent wirelessly and 730 may represent a radio and antenna. In that case the connector, 703 may be omitted, or it may be used for only power. Connector 701 may also be omitted if the sensing device does not require a load input. This is represented as a dedicated standalone rotation sensor by 141, 143, or 232 in FIG. 2.

The sensing device illustrated in FIG. 7 may take a form similar to the embodiment of FIG. 3, or FIG. 5 by including the illustrated connectors or suitable pigtails. The radio or battery may be omitted in those embodiments when a wired connection is utilized. The housing illustrated by 700 may be attached to the rod lift system by any of the aforementioned means. The connectors 701 and 703 may be placed on the same side of the housing. The circuit board 710 represents an embodiment that may be similarly placed into the housing of FIG. 3 or FIG. 5 or may be integrated as part of a wireless loadcell.

The sensing device may measure several signals including rod load, linear stroke position, rotational status, magnetic field strength, angular velocity, acceleration, or barometric pressure. It may further determine data through calculated values based on the sensed measurements. For example, the acceleration may be converted to velocity and again to position. The magnetometer may be used to identify a specific point in the stroke such as the bottom of stroke. This may then be used as initial values to improve the integration calculation (acceleration to velocity to position).

These digital signals are then converted to electrical signals compatible with the well automation controller. These signals may include rod load, linear position, rotational status, torque-induced rod binding and associated torque release events. In the case of rod load, the provided (converted) analog signal would emulate the resistance signals of a loadcell. Likewise, with linear stroke position, an analog signal may be provided. In some instances, a discrete "end of stroke" signal may be provided. The rotation signals may be analog voltage or a discrete switch. Rod load and stroke position are dedicated inputs on typical well controllers. Rod rotation status is not a common explicit input, but these automation controllers typically have general purpose I/O channels that can be used for this purpose.

It is important to ensure the measured load and measured linear position of the polished rod are synchronized in time. In other words, a load value must correspond to a position at that point in time. If one of these is delayed relative to the other, erroneous results may occur in the analysis or operation of the well. It is, however, possible to delay both readings for some short period to ensure they are properly synchronized when provided. This may be useful in the case of detecting the bottom of stroke from the magnetometer signal. It may be beneficial to wait until an end of stroke is positively detected before triggering that signal to the automation controller. The load signal may be delayed for some short period, and for every sample, such that the end of stroke can be determined over this window and triggered according to the correctly timed load value. Approximately one second is a reasonable delay for this process. Load values are a safety factor in the control of a well, and so it should not be delayed too long, but one second is an acceptable response time in this context.

I claim:

1. An apparatus for affixing a polished rod rotation monitoring device to a rod lift system of a well, comprising:
    an enclosure constructed of metal, or plastic, or rubber, or a combination of these materials; and
    at least one attachment mechanism extending from the enclosure and configured to attach the enclosure to a member of the rod lift system, wherein the member is either round or irregular shaped;
    wherein the enclosure is configured to enclose either a circuit board or a magnet;
    wherein the enclosure creates an angled cradle configured to receive the member, the enclosure further comprising an undercut through which the attachment mechanism passes;

wherein the undercut incorporates one or more retention mechanisms to position the attachment mechanism away from a near side of the member such that the attachment mechanism draws the enclosure against the member;

wherein a vertical height of the enclosure is less than 4 inches; and wherein a horizontal extent of the enclosure does not extend more than 4 inches as measured from an axial center of the member.

2. The apparatus of claim 1, wherein;

the enclosure contains the circuit board and comprises one or more sensor selected from the group consisting of; a magnetometer sensor, a gyro sensor, an accelerometer sensor, a barometric pressure sensor, a loadcell signal converter; or, the enclosure contains the magnet.

3. The apparatus of claim 1, wherein the attachment mechanism comprises one or more attachment mechanism selected from the group consisting of; a zip-tie, band-clamp, safety wire, a rubber strap, or an adhesive strap, and the attachment mechanism either;

substantially encompasses both the attached member and the enclosure; or the attachment mechanism encompasses the attached member and a portion of the enclosure.

4. The apparatus of claim 1, wherein the enclosure is attached to the rod lift system at a location selected from the group consisting of;

on the polished rod, above a rod rotator mechanism; or
on a polished rod clamp above the rotator mechanism; or
on the polished rod below a bridle assembly; or
on a polished rod clamp below the bridle assembly; or
at the top of an exposed portion of the polished rod; or
on the bridle assembly; or
on a bridle cable; or
on or near a stuffing-box positioned on top of a wellhead associated with the well, through which the polished rod travels; or
on or near a tubing hangar associated with the well; or
at a fixed location substantially near the traveling polished rod; or
incorporated into a loadcell associated with the bridle assembly.

5. The apparatus of claim 1, wherein the enclosure is configured to accept the circuit board: and either an optional battery, or an optional wired connection; wherein the circuit board and the optional battery or the optional wired connection are arranged at an angle relative to their long axes such that the angle created resides in the horizontal plane.

6. The apparatus of claim 1, wherein the enclosure is configured to orient the circuit board and battery at an angle relative to their long axes, such that the overall height and radial size of the enclosure are minimized.

7. The apparatus of claim 1, wherein the angled cradle provides at least 2 points of the contact between the enclosure and the member, and wherein the attachment mechanism provides at least a third point of contact to secure the member against the enclosure.

8. The apparatus of claim 1, wherein the enclosure comprises a sensing device, and utilizes a wired connection for power and digital data, wherein the cable providing the power and digital data is a repurposed loadcell cable.

9. The apparatus of claim 8, wherein the sensing device transmits digitized values from one or more of a rotation sensor, a digitized load signal from an existing loadcell, or a digitized position signal.

10. The apparatus of claim 8, wherein the sensing device transmits a processed position signal, or a processed rotation signal, from one or more of an accelerometer, a gyroscope, or a magnetometer.

* * * * *